United States Patent
Rose et al.

(10) Patent No.: US 10,034,141 B2
(45) Date of Patent: *Jul. 24, 2018

(54) SYSTEMS AND METHODS TO IDENTIFY HOME ADDRESSES OF MOBILE DEVICES

(71) Applicant: NinthDecimal, Inc., San Francisco, CA (US)

(72) Inventors: Elena Rose, Los Altos Hills, CA (US); Mark Christopher Dixon, Belmont, CA (US); Kevin Toshio Ching, Berkeley, CA (US); Veronica Milenkiy, Burlingame, CA (US)

(73) Assignee: NINTHDECIMAL, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/655,751

(22) Filed: Jul. 20, 2017

(65) Prior Publication Data

US 2017/0318434 A1    Nov. 2, 2017

Related U.S. Application Data

(63) Continuation of application No. 15/337,939, filed on Oct. 28, 2016, now Pat. No. 9,730,028, which is a
(Continued)

(51) Int. Cl.
*H04W 24/00* (2009.01)
*H04W 4/02* (2018.01)
(Continued)

(52) U.S. Cl.
CPC .......... *H04W 4/028* (2013.01); *G01S 5/0027* (2013.01); *G01S 5/02* (2013.01); *G01S 5/0252* (2013.01);
(Continued)

(58) Field of Classification Search
CPC ..... H04W 4/028; H04W 64/00; H04W 4/029; H04W 8/18; H04W 4/025; H04W 8/02;
(Continued)

(56) References Cited

U.S. PATENT DOCUMENTS 5,852,630 A   12/1998   Langberg et al.
7,324,896 B1   1/2008   Smith
(Continued)

OTHER PUBLICATIONS

David K. Ihrke and Carol S. Faber, Geographical Mobility: 2005 to 2010, Population Characteristics, Dec. 2012.
(Continued)

*Primary Examiner* — Dhaval Patel
(74) *Attorney, Agent, or Firm* — Greenberg Traurig, LLP

(57) ABSTRACT

Systems and methods including a database storing the identifiers of cells representing residential parcels of real estate properties. Mobile devices determine the coordinates of their locations during a period of time using a location determination system, such as a global positioning system. The coordinates are converted to cell identifiers to look up corresponding residential parcels that have been visited by the mobile devices. A server generates a visitation data set for each residential parcel visited by each mobile device, including different types of frequencies of the mobile device visiting the residential parcel (e.g., night, weekend). A server filters the residential parcels based on visitation frequencies to identify home candidates and then further filters the home candidates based on the count of mobile devices having the home candidates. A home parcel, and thus its address, is identified from the filtered home candidate(s) for each mobile device.

20 Claims, 13 Drawing Sheets

Related U.S. Application Data continuation of application No. 15/014,943, filed on Feb. 3, 2016, now Pat. No. 9,503,863, which is a continuation of application No. 14/594,010, filed on Jan. 9, 2015, now Pat. No. 9,291,700.

(51) Int. Cl.

| | |
|---|---|
| *G01S 5/00* | (2006.01) |
| *H04W 8/02* | (2009.01) |
| *G06F 17/30* | (2006.01) |
| *G01S 5/02* | (2010.01) |
| *H04W 8/18* | (2009.01) |
| *H04W 64/00* | (2009.01) |
| *H04W 4/029* | (2018.01) |
| *H04W 8/10* | (2009.01) |

(52) U.S. Cl.
CPC .. *G06F 17/30241* (2013.01); *G06F 17/30675* (2013.01); *G06F 17/30699* (2013.01); *H04W 4/025* (2013.01); *H04W 4/029* (2018.02); *H04W 8/02* (2013.01); *H04W 8/18* (2013.01); *H04W 64/00* (2013.01); *H04W 8/10* (2013.01)

(58) Field of Classification Search
CPC ............... H04W 8/10; G06F 17/30675; G06F 17/30241; G06F 17/30699; G01S 5/0252; G01S 5/02; G01S 5/0027
USPC ........... 455/456.1, 406, 404.2; 707/724, 736, 707/746
See application file for complete search history.

(56) References Cited

U.S. PATENT DOCUMENTS

| | | | |
|---|---|---|---|
| 7,848,765 B2 | 12/2010 | Phillips et al. | |
| 8,135,505 B2 | 3/2012 | Vengroff et al. | |
| 8,428,867 B2 | 4/2013 | Ashley, Jr. et al. | |
| 8,489,596 B1 | 7/2013 | Milton et al. | |
| 8,521,593 B2 | 8/2013 | Gadhia et al. | |
| 8,725,168 B2 | 5/2014 | Garcia et al. | |
| 8,755,817 B2* | 6/2014 | Nagara ................. | H04W 48/16 455/414.2 |
| 8,768,876 B2 | 7/2014 | Shim et al. | |
| 8,775,817 B2 | 7/2014 | Ransom et al. | |
| 8,792,909 B1 | 7/2014 | Xu et al. | |
| 8,880,097 B1 | 11/2014 | Xu et al. | |
| 9,291,700 B1* | 3/2016 | Rose ..................... | H04W 4/028 |
| 9,307,360 B1 | 4/2016 | Zhyshko | |
| 9,503,863 B2* | 11/2016 | Rose ..................... | H04W 4/028 |
| 9,730,028 B2* | 8/2017 | Rose ..................... | H04W 4/028 |
| 2002/0087522 A1 | 7/2002 | MacGregor et al. | |
| 2002/0111172 A1 | 8/2002 | DeWolf et al. | |
| 2003/0033273 A1 | 2/2003 | Wyse | |
| 2007/0146200 A1 | 6/2007 | Norin et al. | |
| 2008/0248815 A1* | 10/2008 | Busch .................... | H04W 4/02 455/456.5 |
| 2010/0004997 A1 | 1/2010 | Mehta et al. | |
| 2011/0163873 A1 | 7/2011 | McIntosh | |
| 2011/0208425 A1 | 8/2011 | Zheng et al. | |
| 2011/0282964 A1 | 11/2011 | Krishnaswamy et al. | |
| 2012/0058782 A1 | 3/2012 | Li | |
| 2012/0071175 A1 | 3/2012 | Skibiski et al. | |
| 2012/0136724 A1 | 5/2012 | McGuire et al. | |
| 2013/0117109 A1 | 5/2013 | Busch | |
| 2013/0273968 A1 | 10/2013 | Rhoads et al. | |
| 2013/0339185 A1 | 12/2013 | Johnson | |
| 2013/0345957 A1 | 12/2013 | Yang et al. | |
| 2014/0082008 A1 | 3/2014 | Johnson | |
| 2014/0129334 A1 | 5/2014 | Gu et al. | |
| 2014/0195530 A1 | 7/2014 | Milton et al. | |
| 2014/0236669 A1 | 8/2014 | Milton et al. | |
| 2014/0302877 A1 | 10/2014 | Johnson | |
| 2014/0304038 A1 | 10/2014 | Milton et al. | |
| 2015/0019294 A1 | 1/2015 | Milton et al. | |
| 2015/0026181 A1 | 1/2015 | Milton et al. | |
| 2015/0149091 A1 | 5/2015 | Milton et al. | |
| 2015/0199699 A1 | 7/2015 | Milton et al. | |
| 2016/0027055 A1 | 1/2016 | Dixon et al. | |
| 2016/0205503 A1 | 7/2016 | Zhyshko | |
| 2016/0205510 A1 | 7/2016 | Rose et al. | |
| 2017/0048677 A1 | 2/2017 | Rose et al. | |
| 2017/0318434 A1 | 11/2017 | Rose et al. | |

OTHER PUBLICATIONS

John Krumm, Inference Attacks on Location Tracks, Fifth International Conference on Pervasive Computing (Pervasive 2007), May 13-16, Toronto, Ontario, Canada.
Zoubin Ghahramani, Unsupervised Learning, Sep. 16, 2004.
Global Area Reference System (GARS), http://earth-info.nga.mil/GandG/coordsys/grids/gars.html, retrieved on Nov. 13, 2014.
John Krumm, Inference Attacks on Location Tracks, Feb. 2, 2007.
United States National Grid (USNG), http://earch-info.nga.mil/GandG/coordsys/grids/usng.html, retrieved on Nov. 13, 2014.
Universal Transverse Mercator (UTM), the Military Grid Reference System (MGRS), and the Universal Polar Stereographic (UPS), http://earth-info.nga.mil/GandG/coordsys/grids/universal_grid_system.html, retrieved on Nov. 13, 2014.
Wikipedia, Ordnance Survey National Grid, retrieved on Nov. 13, 2014.
Wikipedia, Universal Transverse Mercator coordinate system, retrieved on Nov. 13, 2014.
World Geographic Reference System (GEOREF), 2006.
Combining Attributes from Multiple Sources, U.S. Appl. No. 14/339,329, filed Jul. 23, 2014, Mark Dixon, et al, Final Rejection, dated Dec. 19, 2017.
Systems and Methods to Identify a Predefined Geographical Region in Which a Mobile Device is Located, U.S. Appl. No. 14/593,947, filed Jan. 9, 2015, Yury Zhyshko, U.S. Pat. No. 9,307,360, Apr. 5, 2016.
Systems and Methods to Identify a Predefined Geographical Region in Which a Mobile Device is Located, U.S. Appl. No. 15/016,067, filed Feb. 4, 2016, Yury Zhyshko, Notice of Allowance Mailed—Application Received in Office of Publications, dated Apr. 25, 2017.
Systems and Methods to Identify a Predefined Geographical Region in Which a Mobile Device is Located, U.S. Appl. No. 15/676,871, filed Aug. 14, 2017, Elena Rose, et al, Docketed New Case—Ready for Examination, Oct. 2, 2017.
Systems and Methods to Identify Home Addresses Of Mobile Devices, U.S. Appl. No. 14/594,010, filed Jan. 9, 2015, Yury Zhyshko, U.S. Pat. No. 9,291,700, Mar. 22, 2016.
Systems and Methods to Identify Home Addresses ofmobile Devices, U.S. Appl. No. 15/014,943, filed Feb. 3, 2016, Elena Rose, et al, Publications—Issue Fee Payment Verified, Oct. 14, 2016.
Systems and Methods to Identify Home Addresses of Mobile Devices, U.S. Appl. No. 15/337,939, filed Oct. 28, 2016, Elena Rose, et al, Notice of Allowance Mailed—Application Received in Office of Publications, dated Mar. 27, 2017.

* cited by examiner

US 10,034,141 B2

SYSTEMS AND METHODS TO IDENTIFY HOME ADDRESSES OF MOBILE DEVICES

RELATED APPLICATIONS

The present application is a continuation application of U.S. patent application Ser. No. 15/337,939, filed Oct. 28, 2016 and issued as U.S. Pat. No. 9,730,028 on Aug. 8, 2017, which is a continuation application of U.S. patent application Ser. No. 15/014,943, filed Feb. 3, 2016 and issued as U.S. Pat. No. 9,503,863 on Nov. 22, 2016, which is a continuation application of U.S. patent application Ser. No. 14/594,010, filed Jan. 9, 2015 and issued as U.S. Pat. No. 9,291,700 on Mar. 22, 2016, the entire disclosures of which applications are hereby incorporated herein by reference.

FIELD OF THE TECHNOLOGY

At least one embodiment of the disclosure relates to the determination of regions in which mobile devices are located in general and more specifically but not limited to, the determination of the households of mobile devices.

BACKGROUND

A location determination system, such as a Global Positioning System (GPS), allows a mobile device, such as a mobile phone, a smart phone, a personal media player, a GPS receiver, etc., to determine its current location on the earth. The location of the mobile device is typically calculated as a set of coordinates, such as the longitude and latitude coordinates of a point on the surface of the earth.

However, the location of the mobile device in the form of coordinates of a point on the surface of the earth does not provide sufficient information of interest about the location, such as whether the mobile device is within a particular region associated with a set of known properties.

For example, it may be of interest in certain applications to determine whether the location of the mobile device is within the store of a merchant, within the home of the user of the mobile device, within a recreation area, within a commercial district, etc.

For example, U.S. Pat. App. Pub. No. 2014/0012806, published Jan. 9, 2014 and entitled "Location Graph Based Derivation of Attributes", discusses the generation of a user profile based on mapping the locations of a mobile device to predefined geographical regions and use the attributes associated with the predefined geographical regions to derive and/or augment the attributes of the user profile.

For example, U.S. Pat. App. Pub. No. 2008/0248815, published Oct. 9, 2008 and entitled "Systems and Methods to Target Predictive Location based Content and Track Conversions", discusses the need to analyze the location of a mobile device to determine the types of businesses that the user of the mobile device typically visits, or visited. When the location of a mobile device is within a predefined distance from either the address of a particular business or a geographic location associated with the business, or within a geometric perimeter of the particular business location, it may be determined that the user of the mobile device was at the particular business.

Ray Casting is a known technology to determine whether a given point is within a polygon represented by a set of vertexes. However, Ray Casting is computational intensive involving floating point number computations.

The Military Grid Reference System (MGRS) is a standard used for locating points on the earth. It uses grid squares of various lengths at different resolutions, such as 10 km, 1 km, 100 m, 10 m, or 1 m, depending on the precision of the coordinates provided. A MGRS coordinate includes a numerical location within a 100,000 meter square, specified as n+n digits, where the first n digits give the easting in meters, and the second n digits give the northing in meters.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

One embodiment of the disclosure provides a computationally efficient method and system to determine whether a location of the mobile device is within a predetermined geographical boundary of a region and/or to determine, among a plurality of predefined regions, the identity of one or more regions within which the location of the mobile device is positioned.

Figure 1:
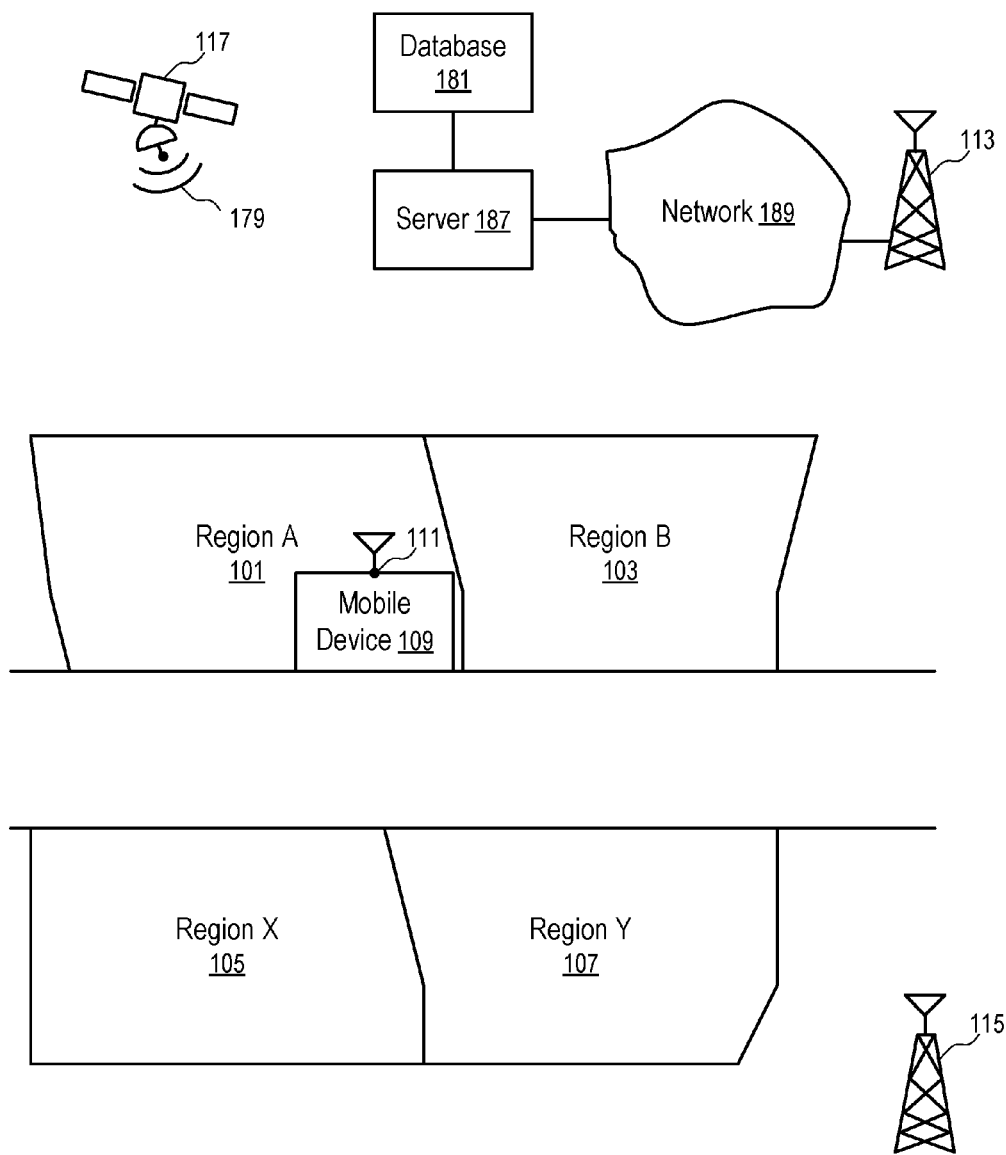
FIG. 1 shows a system to determine whether a mobile device is within a region having a predetermined geographical boundary according to one embodiment.

FIG. 1 shows a system to determine whether a mobile device is within a region having a predetermined geographical boundary according to one embodiment.

In FIG. 1, a location determination system uses the wireless signals (e.g., 179) transmitted to and/or from the mobile device (109) to determine the location (111) of the mobile device (109) on the surface of the earth.

For example, the location determination system may use Global Positioning System (GPS) satellites (e.g., 117) (and/or base stations (e.g., 115)) to provide GPS signals to the mobile device (109). The mobile device (109) is configured to determine the location (111) of the mobile device (109) based on the received GPS signals. In general, multiple GPS satellites (e.g., 117) and/or base stations (e.g., 115) are used to provide the wireless signals (e.g., 179) from different locations for a GPS receiver to determine its locations.

In FIG. 1, the mobile device (109) is configured with a cellular communications transceiver to communicate with the base stations (e.g., 113, 115) of a cellular communications network.

For example, in one embodiment, the mobile device (109) is configured to use signal delays in the cellular communications signals to or from a plurality of cellular base stations (e.g., 113, . . . , 115) to compute the location coordinates of the mobile device (109).

In FIG. 1, a server (187) is configured to communicate with the mobile device (109) via the network (189) and the cellular communications infrastructure (e.g., the base station (113)). The server (187) is connected to a database (181) storing information about the predefined regions (e.g., 101, 103, . . . 105, 107).

For example, the database (181) is configured to store the identifications of a set of cells that are within the boundary of a region (e.g., 101). The server (187) is configured to convert the location (111) of the mobile device (109) to a cell identification and search the identifications of the set of cells representing the region (101) to determine if the cell identification converted from the location (111) of the mobile device (109) is in the set of cell identifications representing the region (101). If the cell identification of the location (111) is found in the set of cell identifications representing the region (101), the location (111) is considered being within the boundary of the region (e.g., 101).

In one embodiment, a hierarchical grid system is used to construct cells that are within the boundary of the region (e.g., 101). Thus, the number of cells within the region (e.g., 101) can be reduced, while the precision of the determination can be selected at a desired level (e.g., 1 meter).

In one embodiment, the identifications of the cells are configured to be signed integer numbers. Thus, any known technologies for searching a given number within a set of signed integer numbers can be used to efficiently determine whether the cell identifier of a location (111) is within the set of cell identifiers of the region (101).

In one embodiment, the conversion of the location coordinates to a cell identifier is configured for improved computation efficiency. The cell identifier is also configured for efficient determination of the resolution of the grid in which the cell is located, the coordinates of the vertexes of the cell, the bounding boxes of the cell, and the identifications of the neighbors of the cells. Details and examples are provided below.

In one embodiment, a given region (e.g., polygon) on earth is represented by a set of cells in a hierarchical, regular grid in a longitude latitude space. In the longitude latitude space, the cells are uniform rectangles/squares at a given resolution; the cell identifies are constructed from the digits of the longitude/latitude coordinates for improved efficiency in conversion between coordinates and cell identifiers. In one embodiment, the resolution levels of the grids correspond to the precision of the longitude/latitude coordinates in terms of the number of digits used to after the decimal point to represent the longitude/latitude coordinates.

Figure 13:
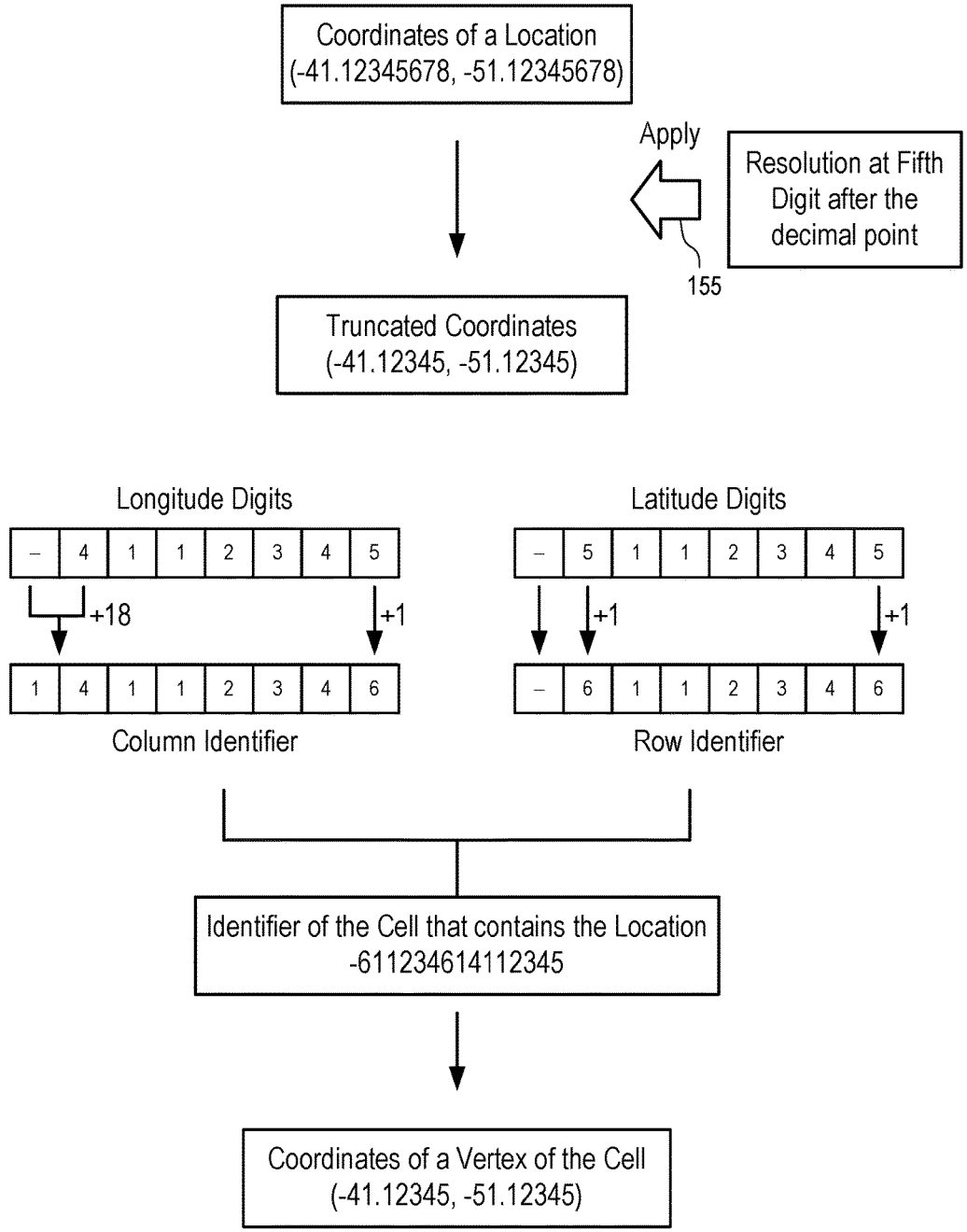
FIG. 13 illustrates an example of converting the coordinates of a location to an identifier of a cell and converting the identifier of the cell to the coordinates of a vertex of the cell according to one embodiment.

At a given resolution in the grid, the identity of the cell that contains a given point identified by a longitude/latitude pair can be computed via simple manipulations of the digits of the longitude/latitude pair, as illustrated in FIG. 13.

Figure 2:
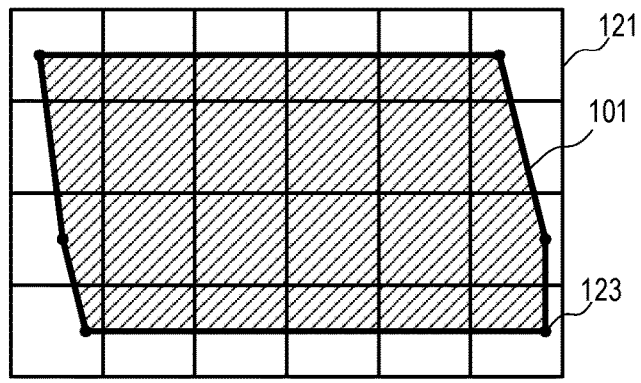
FIGS. 2-4 illustrate a grid system used to determine whether a location of a mobile device is within the geographical boundary of a region according to one embodiment.
Figure 3:
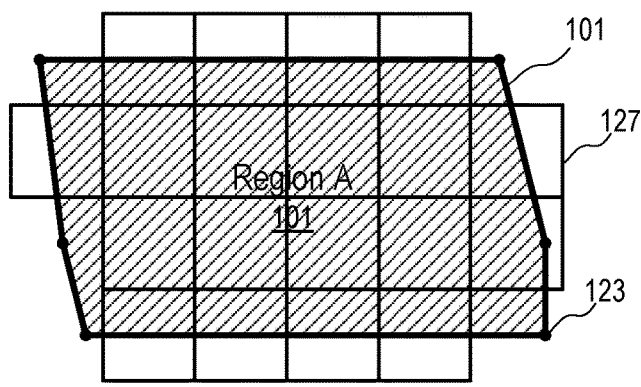
Figure 4:
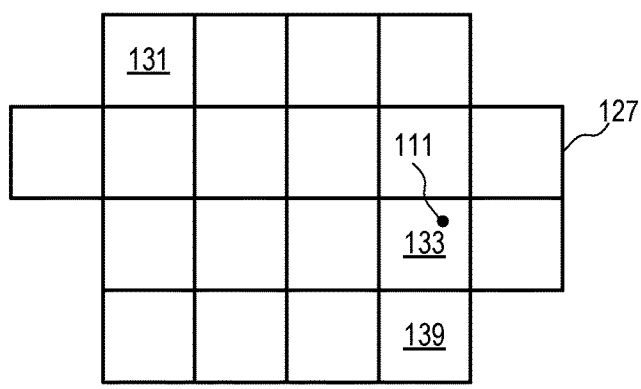

FIGS. 2-4 illustrate a grid system used to determine whether a location of a mobile device is within the geographical boundary of a region according to one embodiment.

In FIG. 2, a grid (121) of cells is used to identify an approximation of the region (101) at a given level of resolution of the grid (121). The resolution level corresponds to the size of the cells in the grid (121).

In FIG. 2, the region (101) is represented as a polygon having a set of vertexes (e.g., 123). The set of line segments connecting the neighboring vertexes (e.g., 123) of the region (101) defines the boundary of the region (101).

FIG. 3 illustrates the selection of a set of cells (e.g., 127) that are considered to be within the boundary of the region (101). Various different methods and/or criteria can be used to classify whether a cell is within the boundary of the region (101), especially the cells that are partially in the region (101) and contain a portion of the boundary of the region (101). The disclosure of the present application is not limited to a particular way to identify or classify whether a cell that is within the boundary of the region (101).

For example, a cell may be classified as being with the region (101) when the overlapping common portion between the cell and the region (101) is above a predetermined percentage of the area of the cell.

For example, a cell may be classified as being with the region (101) when a length of one or more segments of the region (101) going through the cell is above a threshold.

For example, the vertexes of the region (101) may be mapped to the nearest grid points to determine an approximation of the boundary of the region (101) that aligns with the grid lines to select the cells that are located within the approximated boundary of the region (101).

FIG. 4 illustrates the determination of the location (111) within the set of cells (131, . . . , 133, . . . , 139) according to one embodiment. In FIG. 4, each of the cells (131, . . . , 133, . . . , 139) represents a portion of the region (101). To determine whether the location (111) is within the boundary of the region (101), the system is configured to determine whether the set of cells (131, . . . , 133, . . . , 139) contains the location (111).

In one embodiment, to efficiently determine whether any of the cells (131, . . . , 133, . . . , 139) contains the location (111), each of the cells (131, . . . , 133, . . . , 139) is assigned a cell identifier. In one embodiment, each of the cell identifier is a signed integer for improved computation efficiency; and the cell identifier is configured in such a way that the coordinates of any location within the cell can be manipulated via a set of predetermined, computationally efficient rules to provide the same cell identifier, as further illustrated in FIGS. 12 and 13.

In FIG. 4, after the coordinates of the location (111) is converted to the cell identifier of the cell (133) that contains the location (111), the system determines whether the location (111) is within the region corresponding to the set of cells (131, . . . , 133, . . . , 139) by searching in the cell identifiers of the set of cells (131, . . . , 133, . . . , 139) representative of the region (101) to find a match to the cell identifier of the cell (133) that is converted from the coordinates of the location (111). If a match is found, the location (111) is determined to be within the region (101); otherwise, the location (111) is determined to be outside of the region (101).

Figure 5:
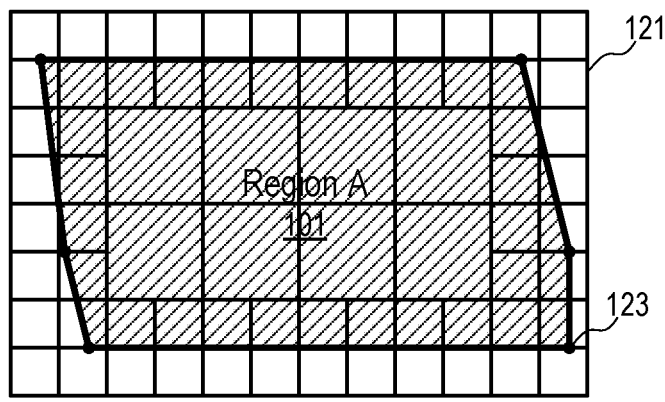
FIGS. 5-7 illustrate a hierarchical grid system used to determine whether a location of a mobile device is within the geographical boundary of a region according to one embodiment.
Figure 6:
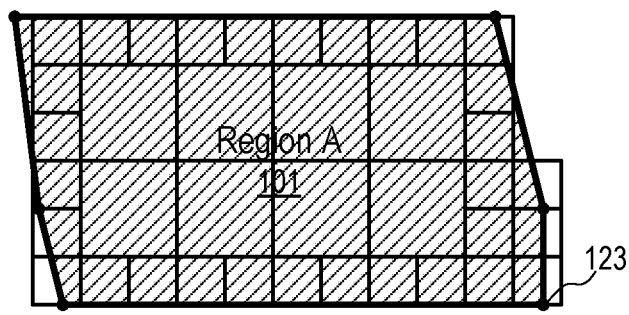
Figure 7:
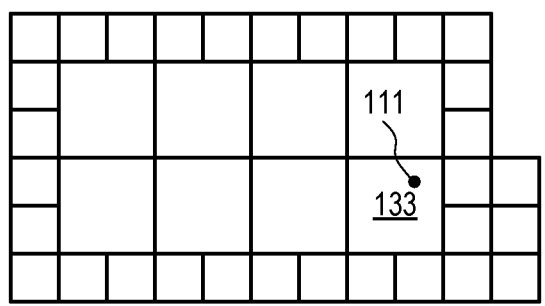

To improve the accuracy in the approximation of the region (101) and computational efficiency, the cells of a hierarchical grid system is used to approximate the region (101). FIGS. 5-7 illustrate a hierarchical grid system used to determine whether a location of a mobile device is within the geographical boundary of a region according to one embodiment.

In FIG. 5, grids of different resolutions are used to identify a set of cells to approximate the region (101). The grids has a predetermined hierarchy, in which the grid lines of a high level grid aligns with some of the grid lines of a low level grid such that the cells of the low level grid subdivide the cells of the high level grid. The grids of different resolutions have different cell sizes.

In general, a grid having a higher resolution and thus smaller cell size can approximate the region (101) in better precision, but uses more cells.

In one embodiment, the cells from the lower resolution grid is used in the interior of the region (101) to reduce the number of cells used; and the cells from the higher resolution grid is used near the boundary of the region (101) to improve precision in using the set of cells to approximately represent the region (101).

For example, in one embodiment, the lowest resolution gird is applied to identify a set of cells to approximate the region (101). The cells in the lowest resolution grid that contain the boundary of the region (101) are split in accordance with the grid of the next resolution level to identify cells in the grid of the next resolution level for improved precision in representing the region (101). The cell splitting process can be repeated for further improved precision using a higher resolution grid.

FIG. 6 illustrates the use of cells from two levels of hierarchical grids to approximate the region (101).

After the set of cells used to approximate the region (101) are identified (e.g., as illustrated FIG. 6), the system is configured to determine whether the location (111) of the mobile device (109) is within the region (101) based on whether any of the set of cells representing the region contains the location (111), in a way as illustrated in FIG. 7.

For example, in one embodiment, each of the cells used in FIG. 7 to represent a part of the region (101) is provided with a cell identifier. The coordinates of the location (111) is mapped to a cell identifier at a given resolution level. The system is configured to search in the set of cell identifiers of region (101) at the corresponding resolution level to determine whether there is a match to the cell identifier as determined from the coordinates of the location (111). If a match in cell identifier is found at any resolution level, the location (111) is determined to be within the region (101) represented by the set of cells; otherwise, the location (111) is determined to be outside the boundary of the region (101).

In one embodiment of FIG. 1, a hierarchical grid system is used to approximate the predefined regions (101, 103, . . . , 105, 106) with cells. Each of the cells is classified/identified as being in one or more of the regions (101, 103, . . . , 105, 106). The database (181) stores the identifiers of the cells in association with the identifies of the respective regions (101, 103, . . . , 105, 106); and the server (187) is configured to compute the identifiers of the cells of different resolutions that contain the location (111) and determine if any of the cell identifiers stored in the database (181) in association with the identifiers of the regions (101, 103, . . . , 105, 106) has the same cell identifier as the location (111). If a matching cell identifier is found, the location (111) of the mobile device (109) is determined to be with the respective region(s) (e.g., 101) associated with the corresponding cell identifier; otherwise, the location (111) is determined to be outside all of the regions (101, 103, . . . , 105, 106) represented by the set of cell identifiers stored in the database (181).

Figure 8:
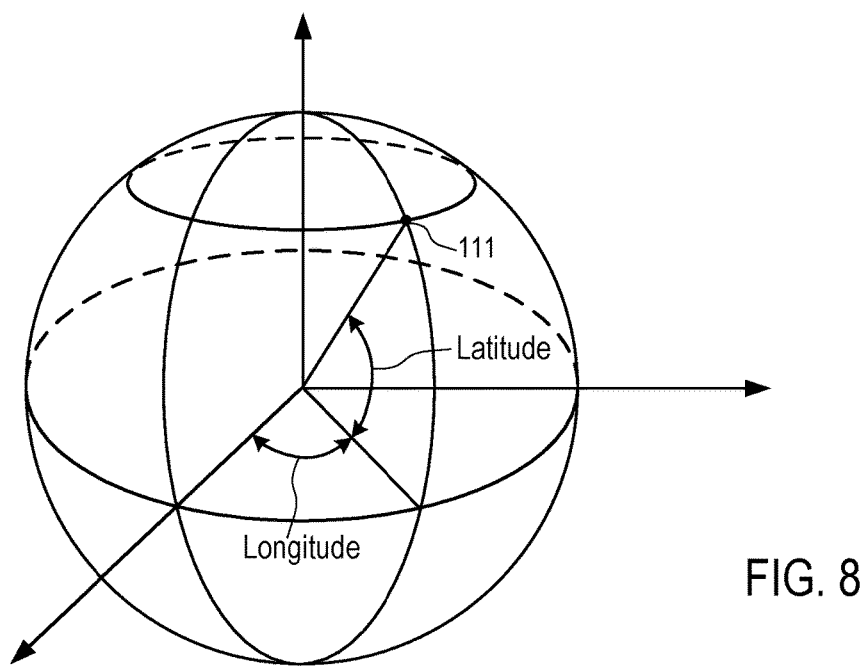
FIGS. 8 and 9 show a top level grid and the identification of cells within the grid according to one embodiment.
Figure 9:
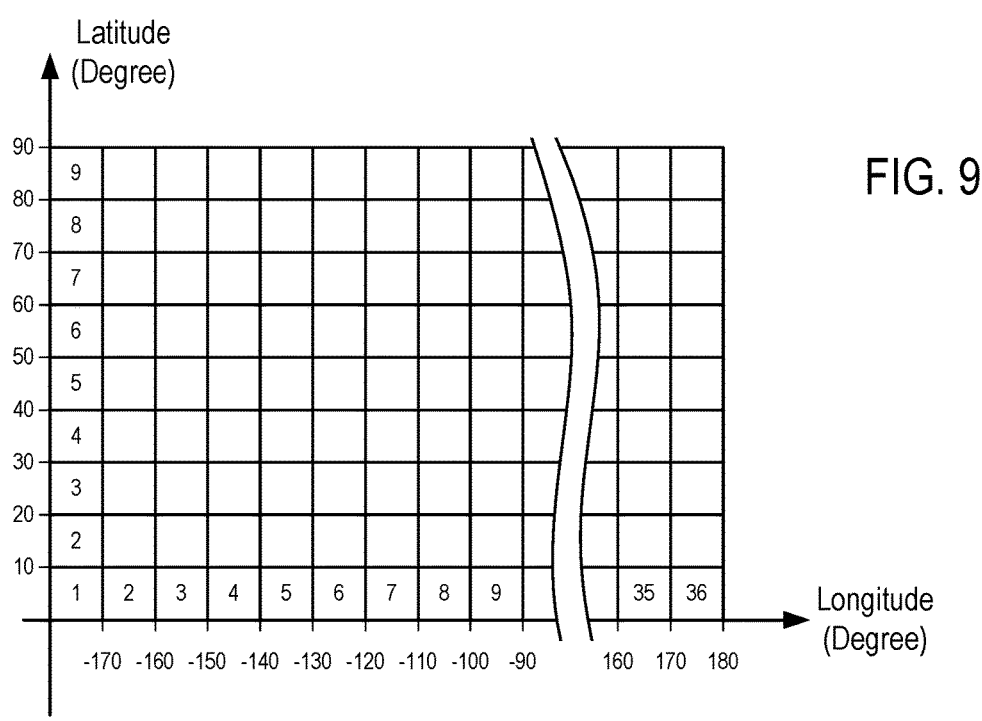

FIGS. 8 and 9 show a top level grid and the identification of cells within the grid according to one embodiment.

In one embodiment, the location (111) of the mobile device (109) is determined to be on the surface of the earth in terms of the longitude and latitude coordinates. In a coordinate system as illustrated in FIG. 8, the longitude coordinates are configured to be within the range of −180 degrees to 180 degrees; and the latitude coordinates are configured to be with the range of −90 degrees to 90 degrees.

In one embodiment, a hierarchical grid system on the surface of the earth is based on a regular grid in the longitude latitude space illustrated in FIG. 9.

In FIG. 9, the cells in the top level grid have a uniform size of 10 degrees in longitude and 10 degrees in latitude. In FIG. 9, the cells are identified by the row identifiers ranging from −9 to −1 and 1 to 9 and column identifiers ranging from 1 to 36.

In FIG. 9, the row and column identifiers are configured in a way to avoid using zero as a row identifier or a column identifier.

In FIG. 9, the row identifier of 1 is assigned to the row of cells between 0 to 10 degrees of latitude; the row identifier of 2 is assigned to the row of cells between 10 to 20 degrees of latitude; etc. The rows of cells between 0 to −90 degrees of latitudes are assigned similar row identifiers with a negative sign. For example, the row identifier of −1 is assigned to the row of cells between 0 to −10 degrees of latitude; the row identifier of −2 is assigned to the row of cells between −10 to −20 degrees of latitude; etc. As a result, the row identifier has a sign and a single digit for the top level cells illustrated in FIG. 9; and the single digit is not zero for any of the rows. Thus, for each location that is inside a cell in the top level grid as illustrated in FIG. 9, the row identifier of the cell containing the location has the same sign as the latitude coordinate of the location and the single digit that equals to 1 plus the tens digit of the latitude coordinate of the location.

In FIG. 9, the column identifier of 1 is assigned to the column of cells having longitude coordinates between −180 to −170 degrees; the column identifier of 2 is assigned to the column of cells having longitude coordinates between −170 to −160 degrees; etc. Thus, for each location that is inside a cell in the top level grid as illustrated in FIG. 9, the column identifier of the cell containing the location has no sign (e.g., the column identifier is always greater than zero) and one or two digits that correspond to adding 18 to a number formed by using the hundreds digit of the longitude as the tens digit and the tens digit of the longitude as the ones digit.

The combination of the row identifier and the column identifier of a cell uniquely identifies the cell within the top level grid as illustrated in FIG. 9. For example, the digits of the column identifier can be appended to the row identifier to generate a signed number that uniquely identifies the cell within the grid illustrated in FIG. 9. For a given cell identifier, the row identifier and the column identifier can be unambiguously deduced from the cell identifier itself, since the row identifier has a signal digit and a sign. The longitude and latitude coordinates of the vertexes of the cell can be computed from the row identifier and the column identifier.

Although FIG. 9 illustrates a preferred way to code the row identifiers and the column identifiers based on the longitude and latitude coordinates of the locations within the cells, alternative coding schemes can be used.

For example, the rows can be coded from 1 to 18 for latitudes from −90 degrees to 90 degrees; and the columns can be coded from 10 to 45 for longitudes from −180 degrees to 180 degrees. Thus, both the row and column identifiers are positive integers, while the column identifiers always have two digits.

For example, the rows can be coded from 11 to 28 for latitudes from −90 degrees to 90 degrees; and the columns can be coded from 11 to 46 for longitudes from −180 degrees to 180 degrees. Thus, both the row and column identifiers are positive integers having two digits.

Figure 10:
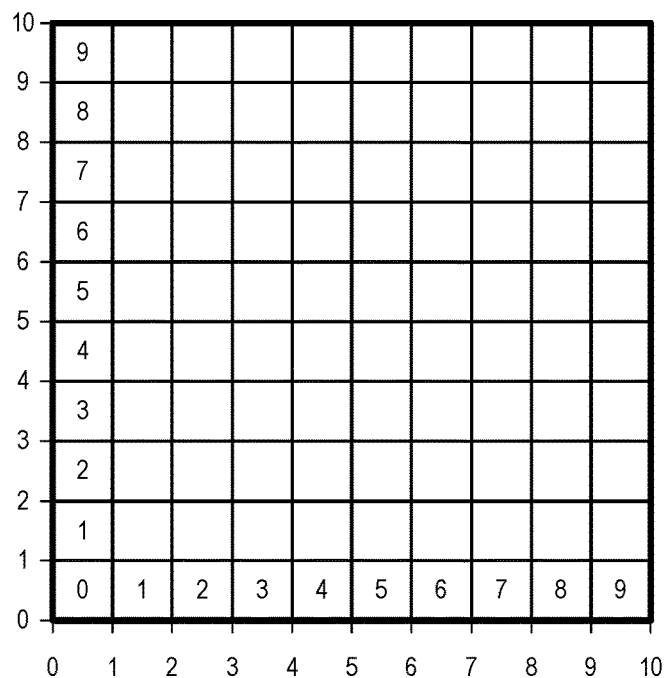
FIG. 10 shows an intermediate level grid and the identification of cells within the grid according to one embodiment.

FIG. 10 shows an intermediate level grid and the identification of cells within the grid according to one embodiment. In FIG. 10, a given cell at a higher level grid (e.g., a cell in the top level grid as illustrated in FIG. 9) is subdivided into 10 rows and 10 columns. The coding of the rows and columns correspond to the measurement directions of the longitude and latitudes coordinates such that the corresponding digits in the longitude and latitudes coordinates at a given precision level can be used directly as the row and column identifiers of the sub-cells within the cell at the higher level grid.

For example, when the cell that is being subdivided into the 10 rows and 10 columns has a size of 10 degrees in longitude and 10 degrees in latitude (e.g., as illustrated in FIG. 9), the row identifier and column identifier of the sub-cells correspond to the ones digit of the latitude and longitude coordinates of the points within the respective sub-cells.

For example, when the cell that is being subdivided into the 10 rows and 10 columns has a size of 1 degree in longitude and 1 degree in latitude, the row identifier and column identifier of the sub-cells correspond to the one-tens digit of the latitude and longitude coordinates of the points within the respective sub-cells.

Figure 11:
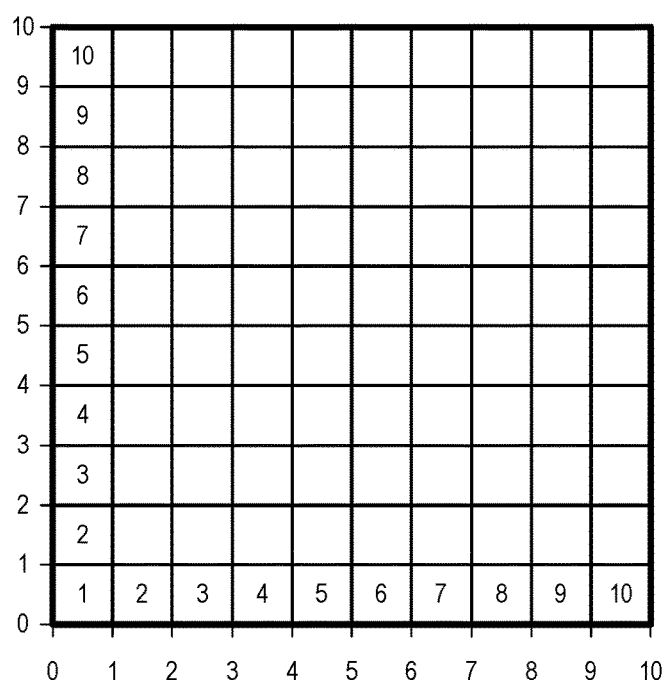
FIG. 11 shows the identification of cells within a grid having the finest resolution in a grid hierarchy according to one embodiment.

FIG. 11 shows the identification of cells within a grid having the finest resolution in a grid hierarchy according to one embodiment. In FIG. 11, the row identifiers and column identifiers are padded by 1, in comparison with the row and column coding scheme illustrated in FIG. 10.

In one embodiment, an identifier cell for a given resolution includes sufficient information to identify the corresponding cells in the higher level grid(s) that contains the cell. Thus, a cell identifier uniquely identifies a cell in the entire hierarchical grid without ambiguity.

Figure 12:
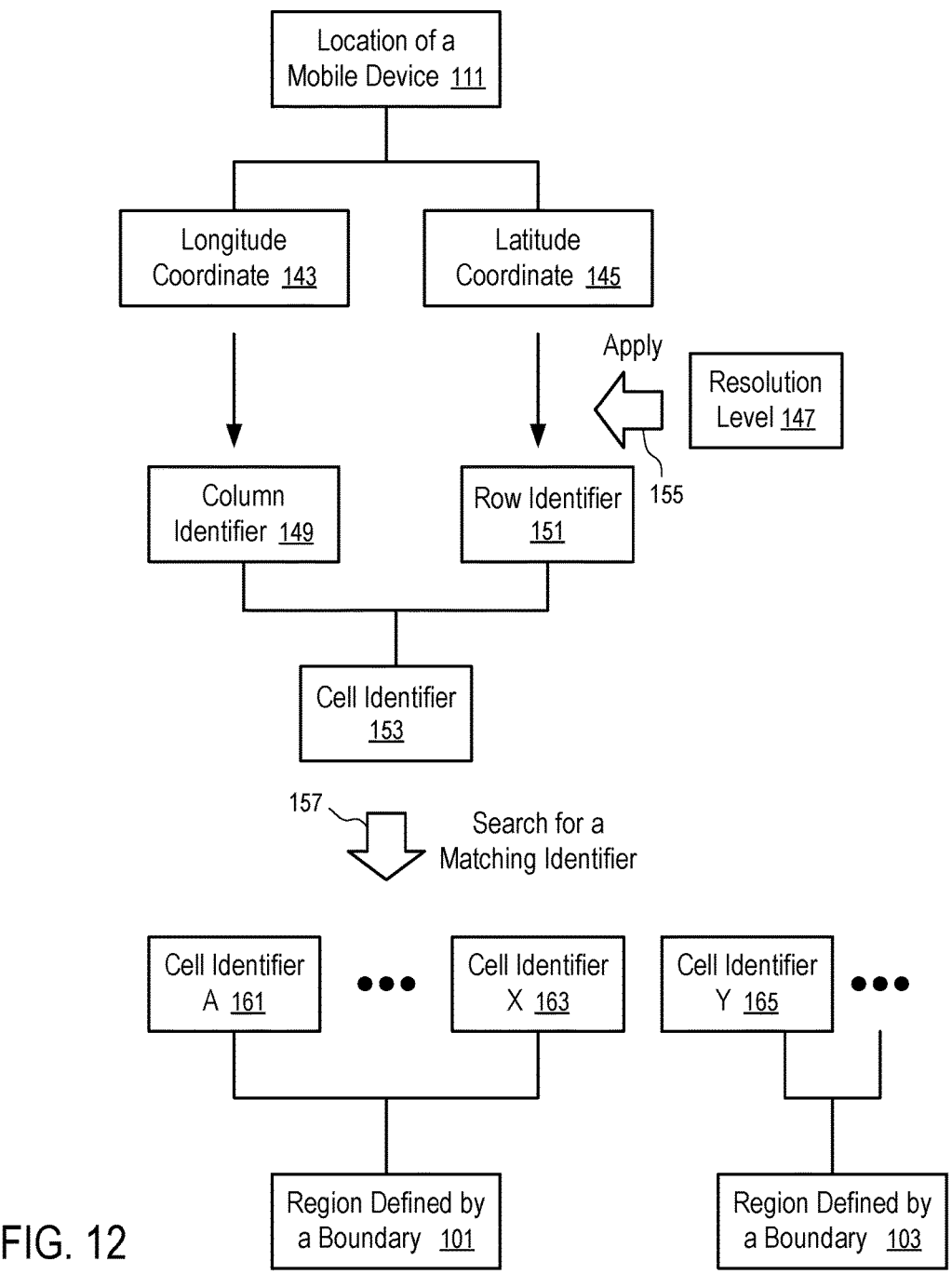
FIG. 12 shows the method to determine whether a location of a mobile device is within the geographical boundary of a region according to one embodiment.

FIG. 12 shows the method to determine whether a location of a mobile device is within the geographical boundary of a region according to one embodiment.

In FIG. 12, the location (111) of the mobile device (109) is determined in terms of the longitude coordinate (143) and the latitude coordinate (145).

For a given resolution level (147), the longitude coordinate (143) and the latitude coordinate (145) are truncated to generate the column identifier (149) and the row identifier (151). Applying (155) the resolution level (147) includes truncating the longitude coordinate (143) and the latitude coordinate (145) to the corresponding digits of precision to generate the column identifier (149) and the row identifier (151). In one embodiment, the digits corresponding to the top level grid and the bottom level grid at the given resolution are adjusted according to FIGS. 9 and 11.

In FIG. 12, the column identifier (149) and the row identifier (151) are combined to generate the cell identifier (153) of the location (111) of the mobile device at the given resolution level (147).

In one embodiment, the database (181) stores a set of cell identifiers (161, . . . , 163) that are associated with the region (101) defined by a predetermined boundary. The server (187) searches (157) the set of cell identifiers (161, . . . , 163) to find a match with the cell identifier (153). If a match is found, the location (111) of the mobile device (109) is determined to be within the boundary of the region (101).

In one embodiment, the database (181) stores a set of cell identifiers (e.g., 161, . . . , 163, 165, . . . ) associated with respective different regions (e.g., 101, 103, . . . ). When the cell identifier (153) of the location (111) of the mobile device (109) is found to be matching with a particular cell identifier (e.g., 163 or 165), the region (e.g., 101 or 103) associated with the particular cell identifier (e.g., 163 or 165) is determined to be the region in which the mobile device (141) is located.

In one embodiment, when a cell contains the boundary of two regions (e.g., 101 and 103), the cell identifier of the cell can be associated with both regions (e.g., 101 and 103). The system may optionally further determine which region the cell is in based on the coordinates of the vertexes defining the boundary (or other parameters that define the boundary between the regions).

FIG. 13 illustrates an example of converting the coordinates of a location to an identifier of a cell and converting the identifier of the cell to the coordinates of a vertex of the cell according to one embodiment.

In FIG. 13, the location has a latitude coordinate of −51.12345678 and a longitude coordinate of −41.12345678. A resolution at the fifth digit after the decimal point is applied to the coordinates to generate the truncated coordinates (−41.12345, −51.12345). The decimal point is removed to obtain the longitude digits −4112345 and the latitude digits −5112345. Since the length of the equator of the earth is about 40,075 km, the cell size near the equator is about 1.11 meters at the resolution corresponding to the fifth digit.

In accordance with the scheme for the top level grid illustrated in FIG. 9, the tens digit for the latitude coordinate is padded with one (without considering the sign of the latitude); and the hundreds digit and tens digit, including the sign, of the longitude coordinate is padded with 18 to generate the row identifier −6 and the column identifier 14 for the top level grid.

In accordance with FIG. 10, the row identifiers and column identifiers of the sub-cells in the hierarchical grid correspond to the respective latitude digits and longitude digits (1, 1, 2, 3, 4).

In accordance with FIG. 11, the row identifiers and column identifiers of the sub-cells in the bottom hierarchy is padded with 1, if the longitude and/or the latitude coordinates of the location is not exactly on the grid lines of the resolution level (e.g., if the longitude or latitude coordinate has nonzero digits after the fifth digit behind the decimal point). One is not padded at the last digit when the longitude and/or the latitude coordinates of the location is exactly on the grid lines of the resolution level (e.g., if the longitude or latitude coordinate has no nonzero digits after the fifth digit behind the decimal point). According to this padding scheme, in the northern hemisphere locations on the northern edge of a cell are included in the cell but not the locations on the southern edge. In the southern hemisphere, locations on the southern edge of a cell are included in the cell but not the locations on the northern edges. Locations on the eastern edge of a cell are included in the cell, but not the western edge.

Thus, the location (−41.12345678, −51.12345678) has the row and column identifiers −6112346 and 14112346. The digits of the column identifier are appended to the digits of the row identifier to generate the cell identifier −611234614112346.

In FIG. 13, the row and column identifiers can be recovered from the cell identifier. The number of digits in the cell identifier divided by 2 provides the number of leading digits for the row identifier; and the remaining digits are for the column identifier. From the row identifier and column identifiers, the latitude digits and longitude digits can be computed via subtraction of the respective padding. The truncated coordinates can be computed from the latitude digits and longitude digits respectively, which can be used to determine the coordinates of a vertex of the cell as (−41.12345, −51.12345). Based on the resolution of the cell being at 0.00001, the coordinates of other vertexes of the cell can be determined as (−41.12346, −51.12345), (−41.12346, −51.12344), (−41.12345, −51.12344). The bounding box of the cell and the neighboring cells can also be easily identified based on the coordinates.

FIG. 13 illustrates a way to append the digits of the column identifier to the digits of the row identifier to generate the cell identifier. Alternatively, the row identifier and the column identifier can be combined in other ways that can be reversed to derive the row identifier and the column identifier from the cell identifier.

For example, when the top level column identifiers are mapped to the range 11 to 46 to have a fixed number of two digits for the top level column, the column identifier is 2411236. Since there is no ambiguity in the number of digits used to represent the top level column, the top level column identifier (24) can be appended after the top level row identifier (−6), which is then appended with the row and column identifiers of the next level, and so on. Thus, a cell identifier of −6241111223366 can be generated, with the sign then the first three digits representing the top level row and column, and two digits for subsequent next level row and column to identifying the subdivision within the higher level cell.

In some embodiments, the row and column identifiers of the bottom level are not padded in a way illustrated in FIG. 11 to have different ways to account for the locations on grid lines at the lowest level resolution.

FIGS. 9-11 and 13 illustrate a grid hierarchy based on a decimal representation of longitude and latitude coordinates. Alternatively, the grid hierarchy can be constructed in accordance with longitude and latitude coordinates expressed using other bases, such as binary, ternary, quintal, octal, duodecimal, etc. in a similar way.

Further, in some embodiments, the longitude and latitude coordinates may be normalized (e.g., in the standardized data range between 0 to 1); and the grids can be constructed in the space of the normalized longitude and latitude coordinates.

The hierarchical grid can also be extended to a three-dimensional space. For example, a hierarchical grid can be constructed with regular grids in the longitude, latitude, altitude space, or in a mapped or normalized longitude, latitude, and altitude space.

Figure 14:
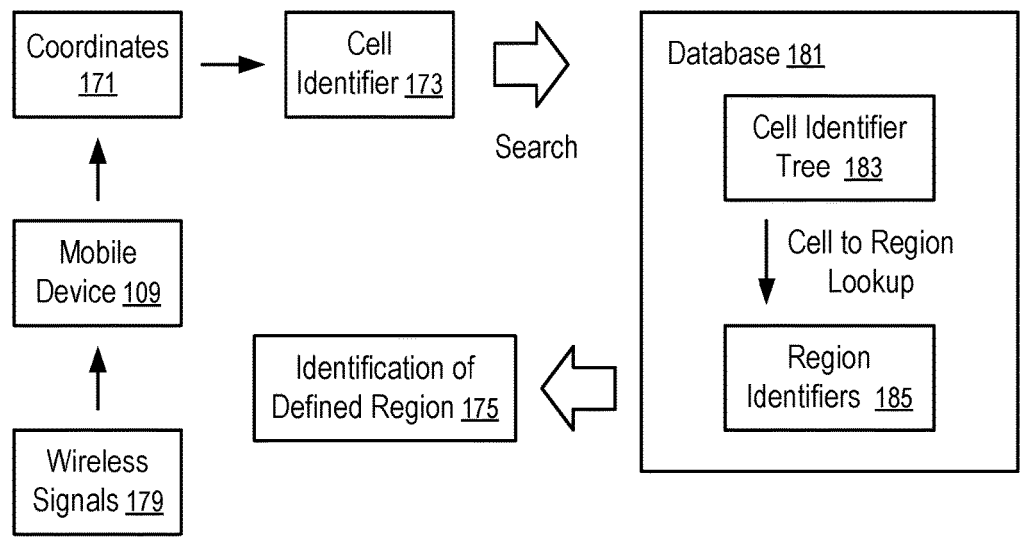
FIG. 14 shows a system configured to map a location of a mobile device to one or more identifications of regions according to one embodiment.

FIG. 14 shows a system configured to map a location of a mobile device to one or more identifications of regions according to one embodiment. In FIG. 14, the mobile device (109) determines the coordinates (171) of its location (111) based on the wireless signals (179) to and/or from a location determination system, such as the Global Positioning System (GPS).

The coordinates (171) are converted to a cell identifier (173) of a cell that contains the location, e.g., in a way as illustrated in FIG. 12 or 13.

In the database (181), a set of cell identifiers are stored in association with region identifiers (185), where each of the cell identifiers is associated with one or more of the respective regions when the respective cell contains at least a portion of the one or more of the respective regions.

In one embodiment, the set of cell identifiers are organized as a cell identifier tree (183) to facilitate the search of a matching identifier.

For example, the cell identifier tree (183) can be constructed as a self-balancing tree for efficient searching of a cell identifier matching the cell identifier (173) generated from the coordinates (171) of the mobile device (109).

In general, any methods to search for an identifier with a set of predetermined identifiers can be used to search for the matching cell identifier (173).

From the association of the cells with the region identifiers (185) in the database, the server (187) determines the identification (175) of the one or more defined regions that are at least partially in the cell identified by the cell identifier (173). Thus, the location (111) of the mobile device (109) is determined to be within the region(s) identified by the identification (175) of the defined region(s).

Similarly, after regions of different sizes and locations are represented via the cells in the hierarchical grid, the system can be configured to efficiently compute overlapping portions of regions via searching for cells having the same identifications.

For example, to determine the approximate overlapping between regions, the percentage of overlapping, the square of overlap, etc., the system is configured to count a number of overlapped cells to determine the overlapping.

In one embodiment, a polygon or any other shape is approximated by a set of rectangular and/or square cell of different sizes in a suitable coordinate system (e.g., in longitude latitude space). Each cell is represented by a single number as identifier. The identifiers of the cells used to approximate the polygon or shape can be organized as a binary tree, a self-balanced tree, a Red/Black Tree, or other structures that are known to provide logarithmic search time to improve the computation efficiency in determining whether a point is within the polygon or shape.

For example, a polygon representing the boundary of United States of America USA on a map may include 2,000 vertexes. The Ray Casting algorithm has O(n) complexity to calculate if a point is within the polygon. When this polygon is approximated via a hierarchical grid system discussed above, the polygon can be represented 700 to 2,000,000 cells in the longitude latitude space, depending on the required precision. When the polygon is represented by 2,000,000 cells and their corresponding identification numbers, searching a matching identifier at the same precision via a binary tree gives log(2,000,000)=21 complexity, which is much less than 2,000. Thus, the present disclosure improves the computational efficiency of identifying a region in which a mobile device is located.

Figure 16:
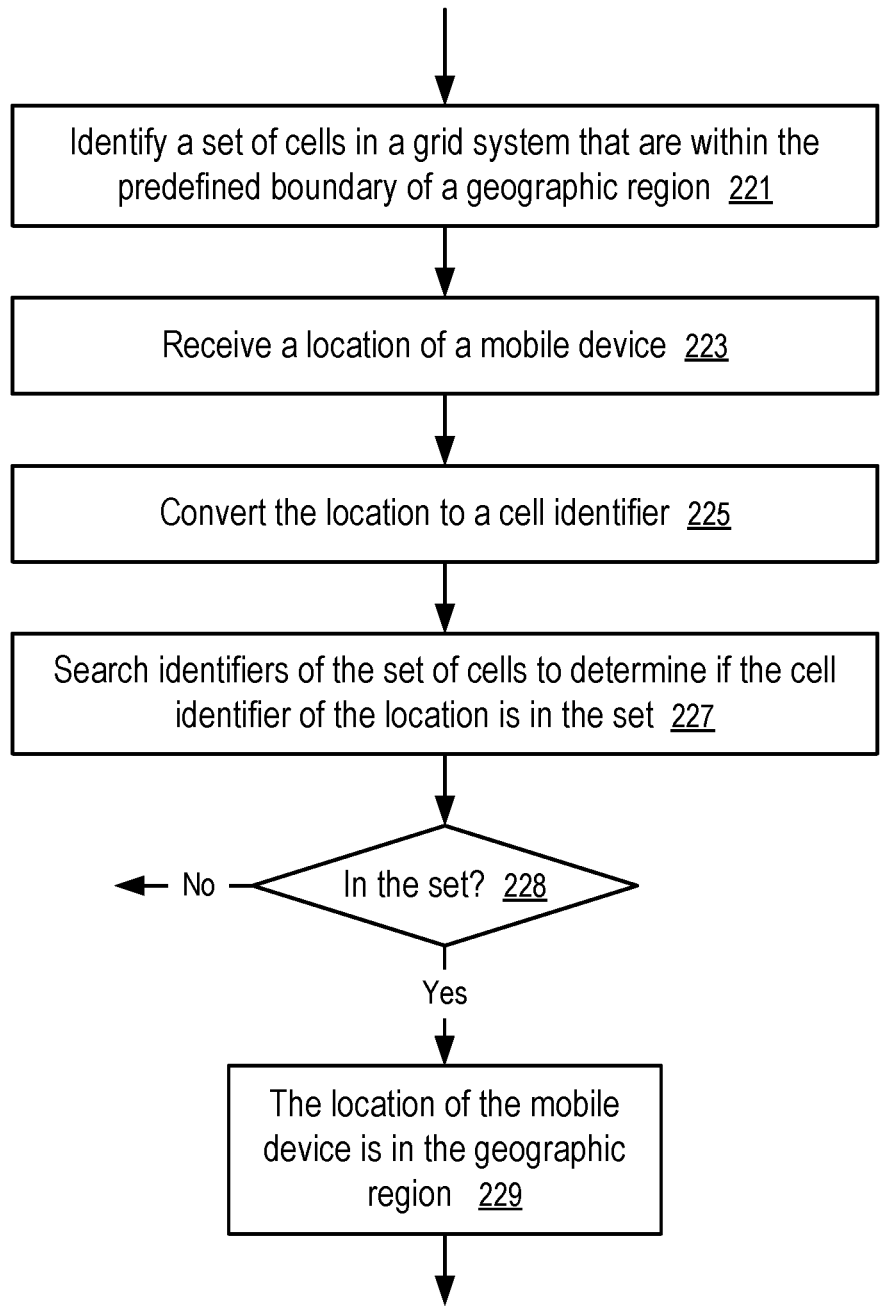
FIG. 16 shows a method of mapping a location of a mobile device to a region according to one embodiment.

FIG. 16 shows a method of mapping a location of a mobile device to a region according to one embodiment. For example, the method of FIG. 16 can be implemented in the system of FIG. 1 and/or FIG. 14, using the grid system illustrated FIGS. 2-8, and/or the grid system and cell identifier system illustrated in FIGS. 8-13.

In FIG. 16, a computing apparatus is configured to: identify (221) a set of cells in a grid system that are within the predefined boundary of a geographic region; receive (223) a location (111) of a mobile device (109); convert (225) the location (111) to the identifier of a cell that contains the location; and search (227) identifiers of the set of cells to determine if the cell identifier of the location (111) is in the set. If it is determined (228) that the cell identifier of the location (111) is in the set, the computing apparatus determines (229) that the location (111) of the mobile device (109) is in the geographic region.

In one embodiment, the computing apparatus includes at least one of: the database (181) and the server (187).

In one embodiment, the database (181) is configured to store an identifier of a geographical region (101) having a predefined geographical boundary defined by a set of vertexes (e.g., 123) or a set of other parameters, such as a center location and a radius.

The database (181) further stores a set of cell identifiers, each of which identifies a cell that is determined to be within the predefined geographical boundary of the geographical region (101).

After the server (187) receives, from a mobile device (109), a location (111) of the mobile device (109), the server (187) converts a set of coordinates (143, 145) of the location (111) of the mobile device (109) to a cell identifier (153) of a cell that contains the location (111). In some embodiments, the mobile device (109) generates the cell identifier (153) at a desired precision level to represent the location (111) of the mobile device (109).

The server (187) determines whether the location (111) of the mobile device (109) is within the geographical region (101) based on searching the set of cell identifiers to determine if the set has the cell identifier (153) computed from the coordinates (143, 145) of the location (111) of the mobile device (109).

In one embodiment, to convert the set of coordinates (143, 145) of the location (143, 145) to the cell identifier (153), the server (187) (or the mobile device (109)) generates two integers from longitude and latitude coordinates of the location (111) of the mobile device (109) according to a precision level (e.g., resolution level (147)), and combine the two integers into the first cell identifier (153) without using a floating point number computation.

In one embodiment, each cell using the in the system to approximate the regions and the locations is a rectangle/square area in a longitude latitude space of locations on the earth. The size of the cell can be unambiguously determined from the cell identifier itself. Further, the longitude and latitude coordinates of corners of the cell identified by the cell identifier can be unambiguously determined from the cell identifier itself.

In one embodiment, the set of cells identified by the set of cell identifiers to approximate one or more regions (e.g., 101, 103, . . . , 105, . . . , 107) has a plurality of different cell sizes that correspond to a plurality of predetermined cell resolution levels. Each of the plurality of predetermined cell resolution levels corresponds to a predetermined precision level of longitudes and latitudes of locations on the earth. For example, each of the plurality of predetermined cell resolution levels corresponds to a precision to a predetermined digit after the decimal point in longitude and latitude coordinates of locations on the earth.

In one embodiment, a cell identifier itself includes sufficient information to determine the resolution level of the cell, the coordinates of the vertexes of the cell, and the identifiers of the neighboring cells, etc.

In one embodiment, the database (181) stores data mapping each cell identify in the set of cell identifiers to at least one region identifier, where the cell contains a least a part of each of the regions identified by the at least one region identifier. The server (187) is configured to search the set of cell identifiers to find a cell identifier that matches with the cell identifier (153) computed from the location (141) and thus determine at least one region identifier associated with the matching cell identifier.

For example, in one embodiment, the set of coordinates of the location (111) includes longitude (143) and latitude (145) of the location (111). To converting the coordinates (143, 145) to the cell identifier (153), the server (187) (or the mobile device (109)) selects digits from the longitude (143) and the latitude (145) of the location (111) in accordance with a cell resolution level (147) and combines the digits selected from the longitude (143) and the latitude (145) of the location (111) into an integer representing the cell identifier (153) of the location (111).

As illustrated in FIG. 13, selecting the digits from the longitude and the latitude includes: selecting digits from integer part of the longitude and a first number of digits from the longitude after the decimal point of the longitude to form an integer representation of the longitude at the cell resolution level; and selecting digits from integer part of the latitude and the same first number of digits from the latitude after the decimal point of the latitude to form an integer representation of the longitude at the cell resolution level.

In one embodiment, to generate the column identifier and row identifier of the location (111), a predetermined number (e.g., one) is added to a digit of the integer representation of the latitude that corresponds to the tens digit of the latitude; and a sign is provided to the integer representation of the latitude according to the sign of the latitude.

In one embodiment, after providing a sign to the integer representation of the longitude according to the sign of the longitude, a predetermined number (e.g., eighteen) is added to digits of the integer representation of the longitude that corresponds to the hundreds digit and tens digit of the longitude, in view of the sign provided to the integer representation of the longitude.

In one embodiment, when the latitude coordinate has a non-zero portion that is discarded during the selection of the latitude digits for the integer representation of the latitude, one is added to the ones digit of the integer representation of the latitude without considering the sign of the integer representation of the latitude. When the longitude coordinate has a non-zero portion that is discarded during the selection of the longitude digits for the integer representation, one is added to the ones digit of the integer representation of the longitude without considering the sign of the integer representation of the longitude.

In one embodiment, after the server (187) receives data representing the predefined geographical boundary of the geographical region, such as the coordinates of the vertexes of a region having a polygon shape, the coordinates of the center and the radius of a region having a circular shape, etc., the server (187) identify, in a hierarchy of cell grids, the set of cell identifiers that are determined to be within the predefined geographical boundary.

In one embodiment, when the set of cells being searched having different resolutions (cell sizes), the location (111) of the mobile device (109) is converted to a plurality of cell identifiers at the corresponding resolutions; and the server (187) is configured to search a match of any of the cell identifiers at the corresponding resolutions computed from the location (111) of the mobile device (109).

For example, the identifiers of the cells of different sizes/resolutions to represent the regions can be organized in a single tree; and the identifiers of the location (111) of the mobile device (109) of corresponding sizes/resolutions can be searched concurrently or one after another to find a match.

For example, the identifiers of the cells of different sizes/resolutions to represent the regions can be organized in separate trees according to cell sizes/resolutions; and the identifiers of the location (111) of the mobile device (109) of corresponding sizes/resolutions can be searched concurrently or one after another in the respective trees for corresponding sizes/resolutions.

In one embodiment, each grid in the hierarchy of cell grids corresponds to a rectangle/square grid in longitude latitude space of locations on the earth with a predetermined resolution level that corresponds to a precision level in a floating point decimal representation of longitude and latitude coordinates.

In one embodiment, to identify the homes of mobile devices, parcel boundaries of the real estate properties are used to define geographical regions. Each of the regions/parcels can be identified by a street or mailing address or other identifiers. After the parcels are approximated/represented by cells in a hierarchical grid discussed above, the database (181) stores the data associating the cell identifiers with the parcel identifiers for the parcels that are at least partially in the respective cells identified by the respective cell identifiers. Thus, the above described systems and methods can be used to search and determine the region/parcel in which the location (111) of the mobile device (163) is positioned, by computing the cell identifier from the coordinates of the location (111) at the corresponding resolution and looking up the parcel identifiers based on the cell identifier.

In one embodiment, it is preferred to approximate the parcels (and thus the parcel boundaries) with cells with a resolution level corresponding to the fifth digit after the decimal point in longitude and latitude coordinates. Since the cells at such a resolution level have a maximum size about 1.1 meters on the surface of the earth, the cell representations of the parcels have a precision at 1 meter level. However, an alternative resolution level, such as 1 foot, 1 yard, etc. can be used in a similar way.

In one embodiment, to determine the households of the mobile devices, the locations (e.g., 111) of mobile devices (e.g., 109) are monitored for a period of time (e.g., one month, three months, half a year, a year, etc.). The identities of the residential parcels that contain the locations are determined or looked up for the locations of the mobile devices. The timing of the locations in the respective residential parcels is used to determine different visitation frequencies; and the server (187) selects a residential parcel as the home of the mobile device (109) based on the visitation frequencies, and thus determines the home address of the mobile device (109).

In one embodiment of approximating the parcels/parcel boundaries, when a cell falls into both a residential parcel and a commercial parcel, the cell is considered to be within the residential parcel. When a cell falls into two residential parcels, the cell is considered to be within both residential parcels; and thus, a location found in the cell is considered to be in both residential parcels and a visit to both residential parcels.

In one embodiment, each location (e.g., 111) of the mobile device (e.g., 109) that is monitored during the period of time is tagged with the timestamp at which the location (e.g., 111) is determined or observed. The location coordinates is associated with the timestamp of the location and the device identifier of the respective mobile device. The device identifier uniquely identifier a mobile device (e.g., 109) from the set of mobile devices that are monitored by the system.

In one embodiment, a base file of visitation is created for each pair of a device identifier identifying a mobile device (109) and a parcel identifier of a residential parcel (101) that has been visited by the mobile device (109) in the period of time of monitoring.

For example, the base file may include the number of visits (num_visits) by the mobile device (109) to the residential parcel, determined by the count of distinct days in which locations of the mobile device (109) are determined to be within the cells representing the residential parcel (101), which indicates a frequency of visits to the residential parcel.

For example, the base file may further include the number of days (days_afterhour) that mobile device (109) was seen at the residential parcel (101) during night hours/outside working hours (e.g., between 7 pm and 8 am), which indicates a frequency of visits to the residential parcel after typically working hours.

For example, the base file may further include the number of weekend days (days_weekend) when the mobile device (109) was seen at the residential parcel (101), which indicates a frequency of visits to the residential parcel during weekends.

For example, the base file may further include the data identifying the last time the mobile device (109) was seen at the residential parcel (101).

For example, the base file may further include an indication of whether the mobile device (109) has visited the residential parcel (101) before the time period, and if so the recency of the visits (e.g., the time last seen at the residential parcel (101) before the time period). In one embodiment, the indication and the recency are used to compute a first weight w1 for a score of the residential parcel (101).

In one embodiment, the base file also includes the total number of residential parcels the mobile device (109) has visited during the time period and an indication of whether the residential parcel (101) was selected as the home of the mobile device (109) previously. In one embodiment, the total number of residential parcels and the indication of prior home designation are used to compute a second weight w2 for the score of the residential parcel (101).

In one embodiment, the base file also includes a third weight w3 determined based on the identity of a telecommunication carrier of the mobile device (109) to account for different practices associated with different telecommunication carriers.

In one embodiment, a set of confidence level 1 home parcel prospects is determined based on filtering the device-parcel pairs using the parameters stored in the base files. For example, in one embodiment, for the mobile device (109), a home parcel prospect is required to have num_visits above a first threshold and, either days_afterhour above a second threshold or days_weekend above a third threshold.

In one embodiment, the first, second, third thresholds are determined based on a sparsity parameter calculated based the total number of incoming impressions, local impression latitude/longitude density, and mobile device counts at and around the residential parcel (101) (averaged over nearby parcels). For example, the sparsity parameter may be weighted differently to generate the first, second, third thresholds. In one embodiment, the second threshold for days_afterhour is the same as the third threshold for days_weekend.

After calculating the number of mobile devices seen at each residential parcel (e.g., 101), the server (187) determines home parcels of the mobile devices. If the mobile device (109) has only one home parcel prospect, the home parcel prospect is determined as the home parcel of the mobile device (109).

If the mobile device (109) has a plurality of home parcel prospects, the server (187) identifies a home parcel based on the scores of the home parcel prospects and the number of mobile devices seen at the respective home parcel prospects.

For example, the server (187) starts with a first device threshold (e.g., 10) and determines a subset of the home parcel prospects that have less mobile devices than the first device threshold. If the subset is not empty, the home parcel prospect having the highest score in the subset is identified as the home parcel of the mobile device (109).

However, if the subset identified using the first device threshold is empty, the server (187) proceeds with a higher second device threshold (e.g., 50) to select the subset that have less mobile devices than the second device threshold. If the subset is not empty, the home parcel prospect having the highest number of visits (e.g., num_visits), or the highest score, in the subset is identified as the home parcel of the mobile device (109).

Similarly, if the subset identified using the first device threshold is empty, the server (187) proceeds with a higher third device threshold (e.g., 100), and so on with progressively higher thresholds (e.g., 100, 1000).

In one embodiment, the score of each parcel is determined for a mobile device based on a sum of the weights w1, w2, and w3 discussed above and a ratio between a function of days_afterhour and a function of days_weekend. For example, a score is evaluated as:

$$w1+w2+w3+(days\_afterhours+1)/(days\_weekend+1)$$

In one embodiment, if the mobile device (109) does not have a confidence level 1 home parcel prospect, the first, second and third thresholds for num_visits, days_afterhour, days_weekend are relaxed in the filtering to identify confidence level 2 home parcel prospects. The home of the mobile device (109) at level 2 confidence is then determine in a way similar to the determination of the home of level 1 confidence. In some embodiments, there may be not requirements on days_afterhour and/or days_weekend for confidence level 2 computations.

Figure 17:
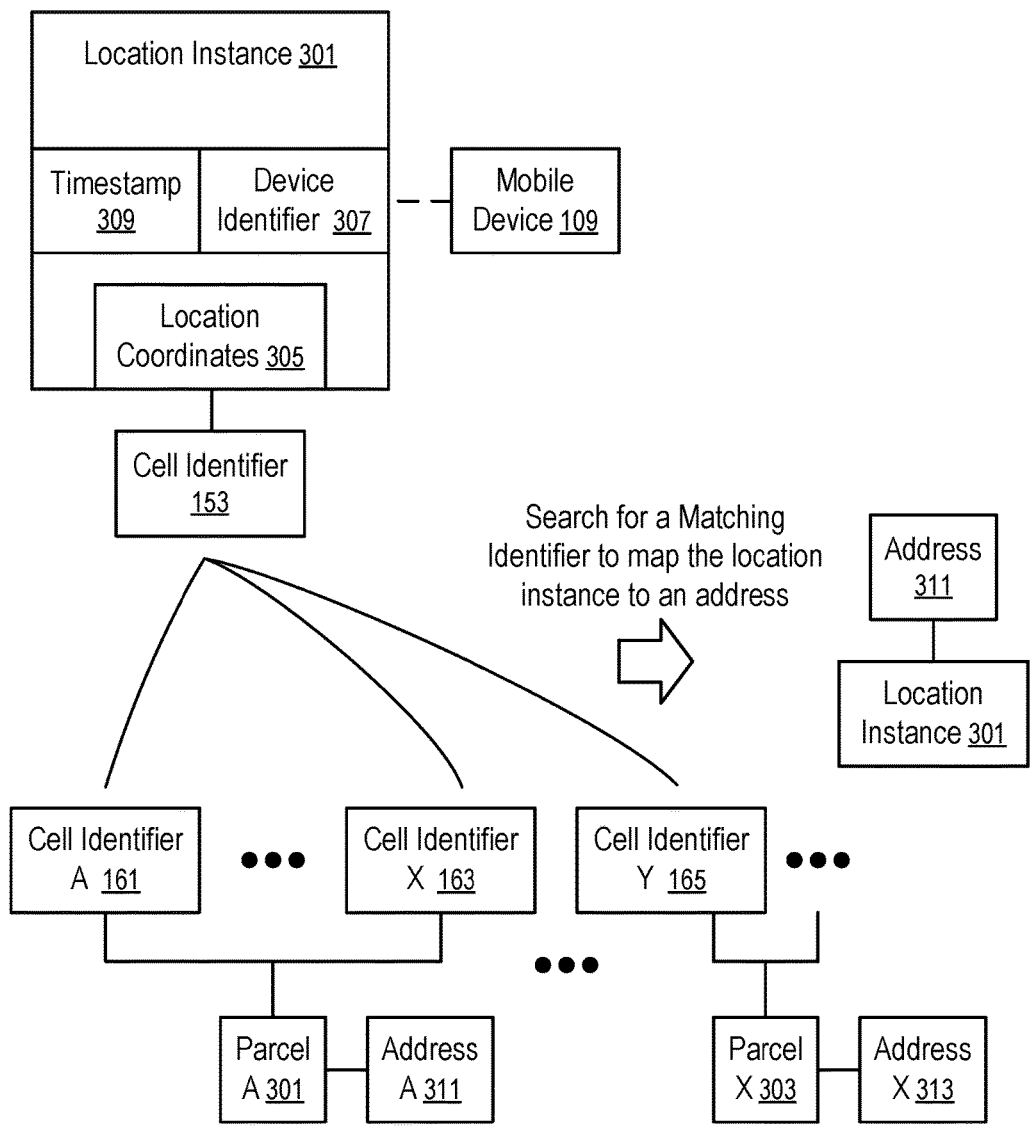
FIG. 17 shows a system of one embodiment to determine the addresses of real estate properties in which a mobile device has visited.

FIG. 17 shows a system of one embodiment to determine the addresses of real estate properties in which a mobile device has visited.

In FIG. 17, the database (181) stores the data associating the parcels (301, . . . , 303) with their respective addresses (e.g., 311, . . . , 313), such as street addresses, mailing addresses, etc. In one embodiment, the database (181) may further store known information of the parcels (301, . . . , 311) and/or the addresses (311, . . . , 313) such as the property tax histories, the service records, credit information, etc. Such information of a parcel can be attached to the identifier of a mobile device (109) after the parcel is identified as a home of the mobile device (109).

In FIG. 17, each parcel (e.g., 301) is represented by a set of cell identifiers (e.g., 161, . . . , 163) to represent a region (e.g., 101), where the region (101) is defined by its parcel boundary data, such as a set of vertexes (e.g., 123) on the parcel boundary. In one embodiment, the cells corresponding to the set of cell identifiers (e.g., 161, . . . , 163) approximate the region (e.g., 101) of the parcel (e.g., 301) to a resolution/precision that is about 1 meter.

In FIG. 17, the mobile device (109) is configured to store and/or track its locations (e.g., 101) using a location determination system. For a location (111) recorded by the mobile device (109), the mobile device (109) provides data to represent a location instance (301), which includes the coordinates (305) of the location (111), an identifier (307) of the mobile device (109), and a timestamp (309) identifying a date and time of the location instance (301). The location instance (301) represents a data point of observing a visit of the mobile device (109) identified by the device identifier (307) at the location (101) specified by the location coordinates (305) at a date and time indicated by the timestamp (309).

In one embodiment, the location coordinates (305) is converted to a cell identifier (153) in a way as illustrated in FIGS. 12-13. The server (187) searches the set of cell identifiers (e.g., 161, . . . , 163, . . . , 165, . . . ) representing the parcels (301, . . . , 303, . . . ) for a match to the cell identifier (153) converted from the location coordinates and associates the location instance (301) with the address (311) or parcel of the marching cell identifier.

In one embodiment, to identify the household of the mobile device, the cell identifiers (e.g., 161, . . . , 163, . . . , 165, . . . ) are limited to cells that contain at least a part of residential parcels. Thus, the location instance (301) is linked to an address (311) visited by the mobile device (109).

In general, during a period of time, a mobile device (109) may visit more than one parcel for various activities. Thus, more than one address may be associated with the location instances (e.g., 301) of the mobile device (109). Further, a household may use more than one mobile device (e.g., 109) and may be visited by guests who use mobile devices.

Figure 18:
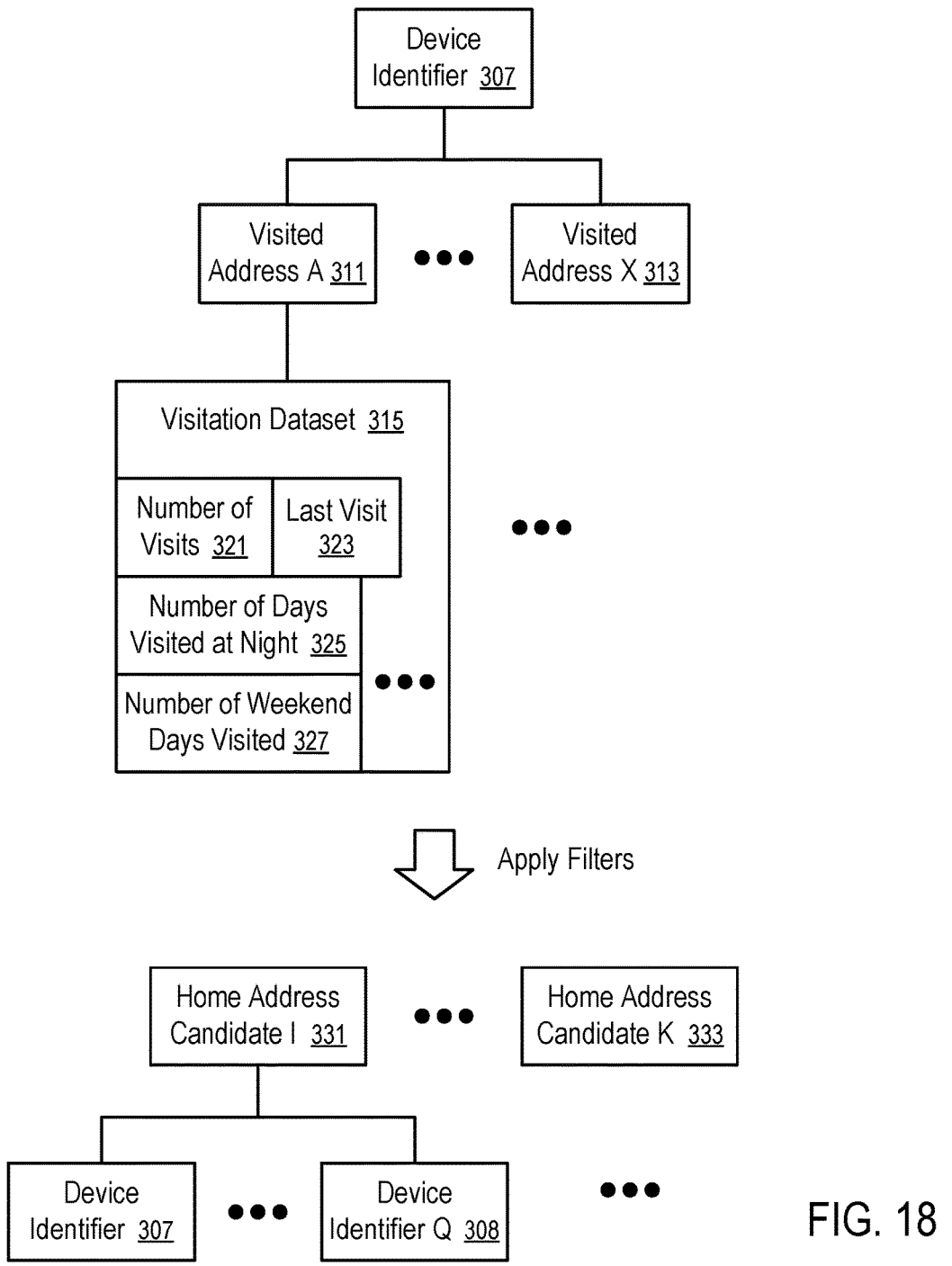
FIGS. 18 and 19 show a system of one embodiment to select a home address of a mobile device from address of real estate properties that have been visited by a mobile device during a period of time.
Figure 19:
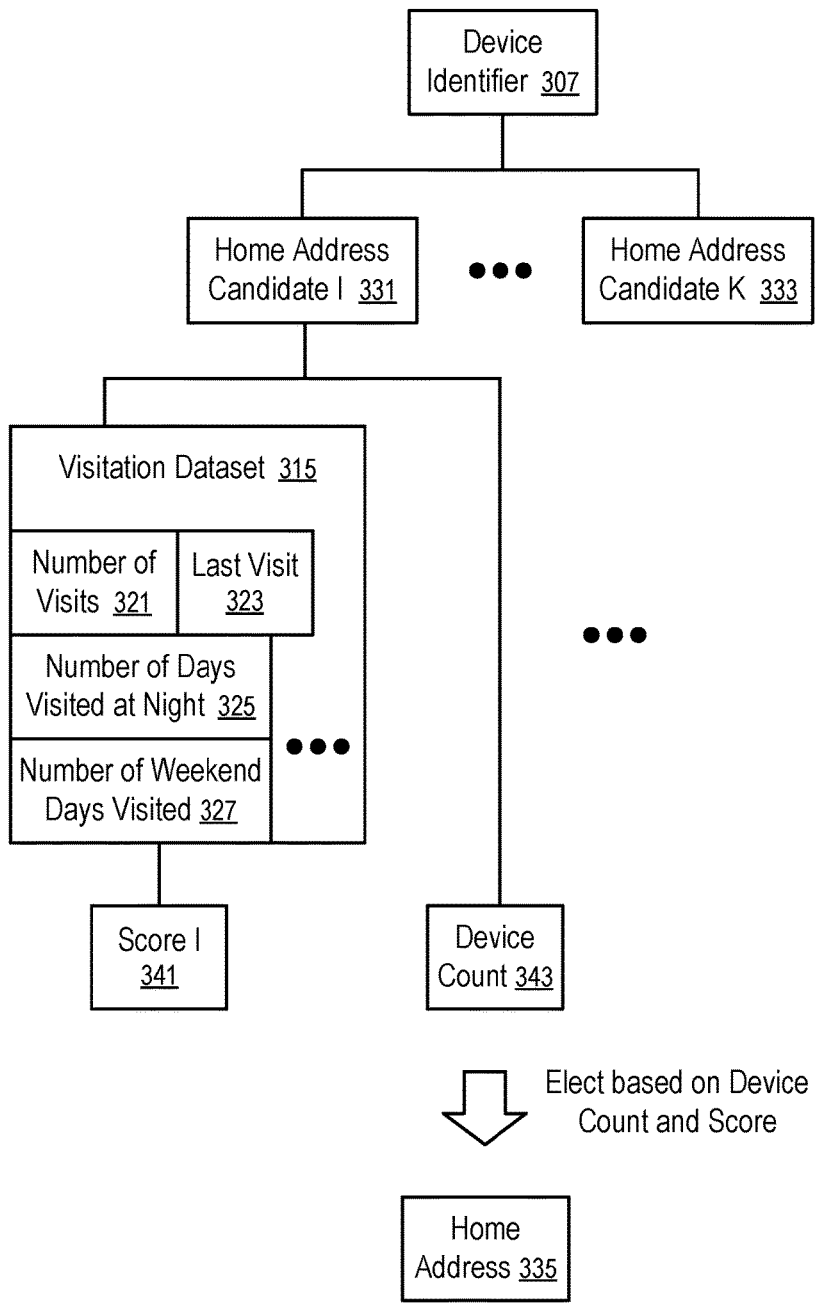

FIGS. 18 and 19 show a system of one embodiment to select a home address of a mobile device from address of real estate properties that have been visited by a mobile device during a period of time.

In FIG. 18, based on the association of the location instances (e.g., 301) with the addresses (311, . . . , 313) of the parcels (e.g., 301, . . . , 313) as determined in a way as illustrated in FIG. 17, the server (187) generates a visitation dataset (315) for each of the addresses (311, . . . , 131) that have been visited by the mobile device (109) identified by the device identifier (307).

In FIG. 18, a typical visitation dataset (315) includes data such as the number of visits (321) to the visited address (311) by the mobile device (109)/device identifier (307) during the period of time, the date and time of the last visit (323), the number of days visited at night (325), the number of days visited during weekend (327), etc. In one embodiment, the number of visits (321) is the number of distinct days the address (311) has been visited by the mobile device (109) represented by the device identifier (307).

In FIG. 18, filters are applied to the addresses (e.g., 311, ..., 313) visited by the device identifier (307) to select the home address candidates (e.g., 331, ..., 333) for the device identifier (307).

For example, if the number of visits (321) of the visited address (311) is lower than a threshold, the corresponding visited address (311) can be removed from the home address candidates (331, ..., 333) for the device identifier (307).

For example, if the number of days visited at night (325) or the number of days visited during weekend (327) is lower than a threshold, the corresponding visited address (311) can be removed from the home address candidates (331, ..., 333) for the device identifier (307).

In FIG. 18, the filtering represents a predetermined confidence level in identifying the home address candidates. When the filtering parameters are changed, the confidence level is adjusted.

In general, a home address candidate (e.g., 331) can be found as potential home for a plurality of device identifiers (e.g., 307, ..., 308) that have visited the same address.

When the filtering results in a single home address candidate (e.g., 331) for the device identifier (307), the single home address candidate (e.g., 331) is determined to be the home address of the device identifier (307).

When the filtering results in a plurality of home address candidates (e.g., 331, ..., 333) for the device identifier (307), a method of FIG. 19 can be used to identify one of the candidates (e.g., 331, ..., 333) as the home address.

In FIG. 19, for each of the home address candidates (331, ..., 333) of the device identifier (307), the server (187) computes a score (341) based on the visitation dataset (315) of the corresponding home address candidate (e.g., 331). Further, for each of the home address candidates (331, ..., 333) of the device identifier (307), the server (187) determines a device count (343) of the device identifiers (e.g., 307, ..., 308) that have the corresponding address as the home address candidate (e.g., 331).

In FIG. 19, a home address is selected based on the device count (e.g., 343) and the score (341) of the home address candidates (e.g., 331, ..., 333).

In one embodiment, the selection of the home address (335) of the device identifier (307) from the home address candidates (e.g., 331, ..., 333) favors an address having a low device counter (e.g., 343) but a high score (e.g., 341).

For example, the device count (e.g., 343) and the score (341) can be combined in a target function to balance the requirement for a low device count (e.g., 343) and a high score (341). Thus, the values of the target function can be compared for different home address candidates (331, ..., 333) to select the home address (335) with the optimal target value.

For example, the server (187) may use a first threshold to select a subset of the home address candidates (331, ..., 333) that have device count (343) lower than the first threshold, and select from the subset a home address that has the highest score. If the subset selected according to the first threshold is empty, a higher threshold is used. In one embodiment, when the device accounts of the candidates are all above a particular threshold, the candidate having the highest score is selected as the home address (335). In one embodiment, different formulas are used to compute the score, based on the device count threshold used to filter the home address candidates (331, ..., 333).

In one embodiment, the score used with the first threshold is at least a function of the number of days (325) visited at night and the number of days (327) visited during weekends; and the score used with 1 subsequently higher threshold is based on the number of visits.

In one embodiment, when at least two home address candidates have the same highest score, the system is configured to consider the visitations observed in a predetermined strip surrounding the respective parcels of the home address candidates to break the tie. In one embodiment, a strip having a predetermined width (e.g., 10 meters) surrounding the boundary of a particular residential parcel but not in another residential parcel is associated with the particular residential parcel. The strip can be identified by identifying the cells that are within the predetermined width outside a residential parcel boundary and not within other residential parcels. To break a tie, the system counts not only the visits (e.g., the number of days of visits, the number of days of visits made at night, the number of days of visits made during weekend, etc.) to the residential parcels, but also the corresponding visits to the associated strip at the boundary of the residential parcels. In one embodiment, the counts of visits to the associated strips are compared directly to break the tie. Alternatively or in combination, the counts of visits to the associated strips are added to the corresponding counts of visits to the corresponding parcels to obtain the augmented scores (e.g., corresponding to the scores (e.g., 341) of the respective home address candidates (e.g., 331)) to break the tie.

Figure 20:
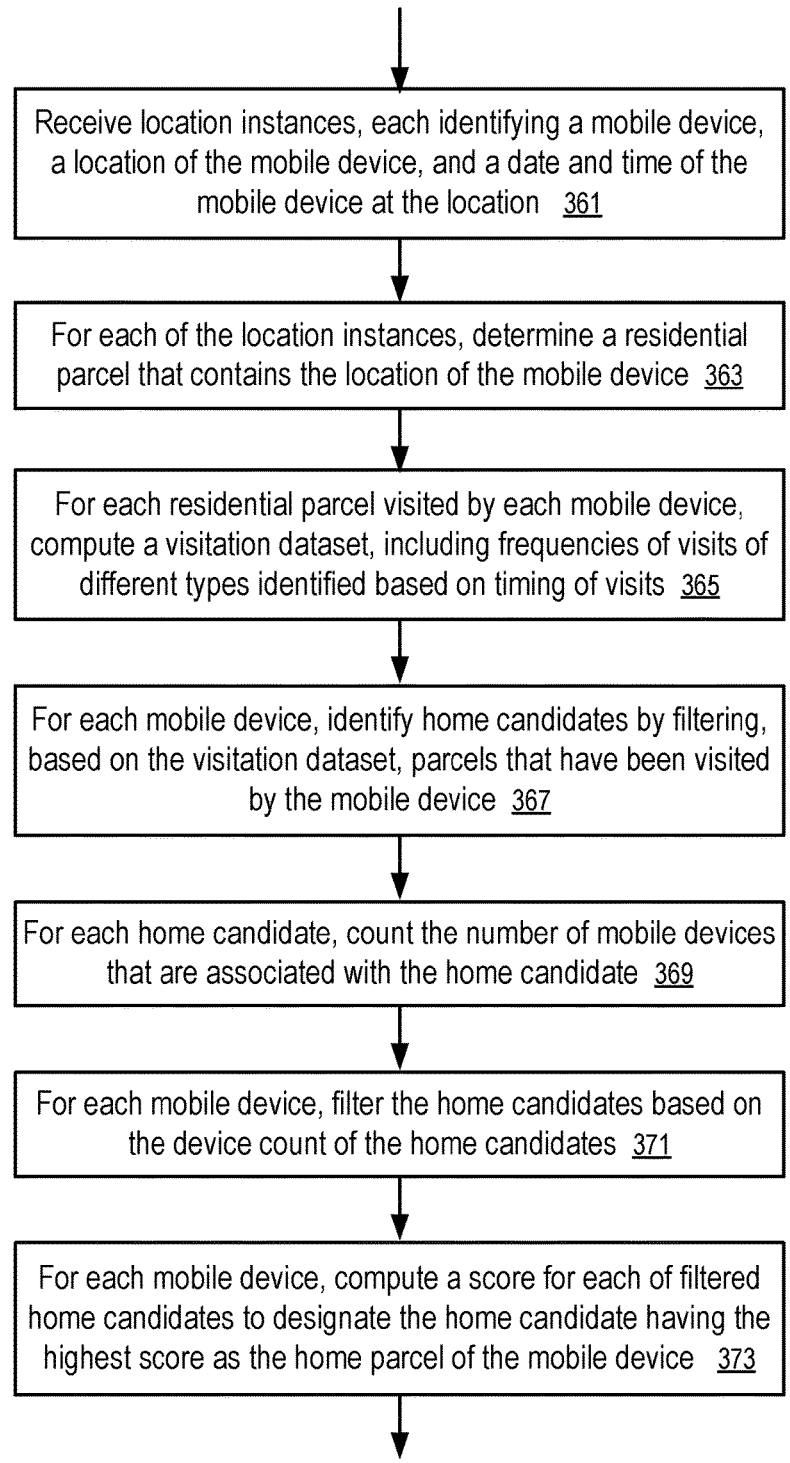
FIG. 20 shows a method to identify a home parcel of a mobile device according to one embodiment.

FIG. 20 shows a method to identify a home parcel of a mobile device according to one embodiment. For example, the method of FIG. 20 can be implemented in a system illustrated in FIG. 1.

In FIG. 20, a computer apparatus, including the server (187) and/or the database (181), receives (361) location instances (e.g., 301), each identifying a mobile device (109) (e.g., via the device identifier (307), a location (111) of the mobile device (109) (e.g., identified by the location coordinates (305), and a date and time (e.g., timestamp (309)) of the mobile device (109) at the location (111).

The computing apparatus determines (363), for each of the location instances (301), a residential parcel (e.g., region (101) defined by parcel boundary data) that contains the location (111) of the mobile device (109). A residential parcel (e.g., 101) containing the location (111) of the mobile device (109) identified by the location instance (301) represents a visit of the mobile device (109) in the residential parcel (e.g., 101) at the date and time identified by the location instance (e.g., 301).

In one embodiment, if the location (111) is not in a residential parcel (e.g., in a commercial area, in a street, etc.), the location instance is discarded for the purpose of identifying the home parcel of the mobile device.

The computing apparatus computes (365), for each residential parcel (e.g., 101) visited by each mobile device (e.g., 109), a visitation dataset (315), including frequencies of visits of different types identified based on timing of visits, such as the total number of visits (321) in a predetermined period of time, the number of days (325) in which the mobile device (109) has visited the residential parcel (e.g., 101) at night during the predetermined period of time, the number of weekend days (327) in which the mobile device (109) has visited the residential parcel (e.g., 101) during the predetermined period of time.

The computing apparatus identifies (367), for each mobile device (e.g., 109), home candidates (e.g., 331, ..., 333) by filtering, based on the visitation dataset, parcels (e.g., 311, ..., 313) that have been visited by the mobile device (109) during the predetermined period of time.

The computing apparatus counts (369), for each home candidate (e.g., 331), the number of mobile devices (e.g., device count (343)) that are associated with the home candidate. In one embodiment, for a given parcel, the computing apparatus counts only the mobile devices that take the given parcel as a home candidate after the filtering (367) based on the visitation dataset.

The computing apparatus filters (371), for each mobile device (e.g., 109), the home candidates (e.g., 331, ..., 333) based on the device count (e.g., 343) of the home candidates (e.g., 331). For example, the computing apparatus may filter (371) the home candidates (e.g., 331, ..., 333) with a set of progressively higher threshold for device count, until a non-empty set of filtering result is obtained.

For example, the computing apparatus initially identify home candidates that have device counts no more than 10. If the home candidates of the mobile device (109) are all larger than 10, the computing apparatus is configured to use a higher threshold for the filtering (371) according to the device count.

After the filtering (371), the computing apparatus computes (373), for each mobile device (109), a score (431) for each of filtered home candidates to designate the home candidate having the highest score as the home parcel of the mobile device (109).

In one embodiment, the score is computed based on the level of filtering (371) that provides non-empty results. For example, in one embodiment, when the filtering is at the first level (e.g., for home candidates having device counts no more than 10), the score for a home candidate (331) is based on a ratio between the number of days (325) the mobile device (109) has been observed to be at the home candidate (331) at night time and the number of days (327) the mobile device (109) has been observed to be at the home candidate (331) during weekends; and when the filtering is at a higher level, the score is based on the number (321) of visits.

In one embodiment, the score is based on a weight determined based on recency of location instances (e.g., 301) of the respective mobile device (109) in the respective region (311).

In one embodiment, the score is based on a weight determined based on a total number of different regions that have location instances of the respective mobile device.

In one embodiment, the score is based on a weight determined based on whether the respective region has been previously identified as the home of the mobile device.

In one embodiment, the filtering (367) of the parcels (311, ..., 313) that have been visited by the mobile device (109) is based on a threshold computed for a respective parcel to determine whether the respective parcel is to be filtered out. The threshold is computed based at least in part on: a count of location instances of different mobile devices located in the respective parcel; and a count of different mobile devices of location instances located in the respective parcel. In one embodiment, the threshold is computed based further on an average count of different mobile devices of location instances located in the respective parcel and neighboring parcels of the respective parcel.

In one embodiment, the respective parcel is not selected as a home candidate when either the count of night days (325) or the count of weekend days (327) of the mobile device (109) at the respective parcel (311) meets the threshold requirement in the filtering (367) based on the visitation dataset (315).

Figure 15:
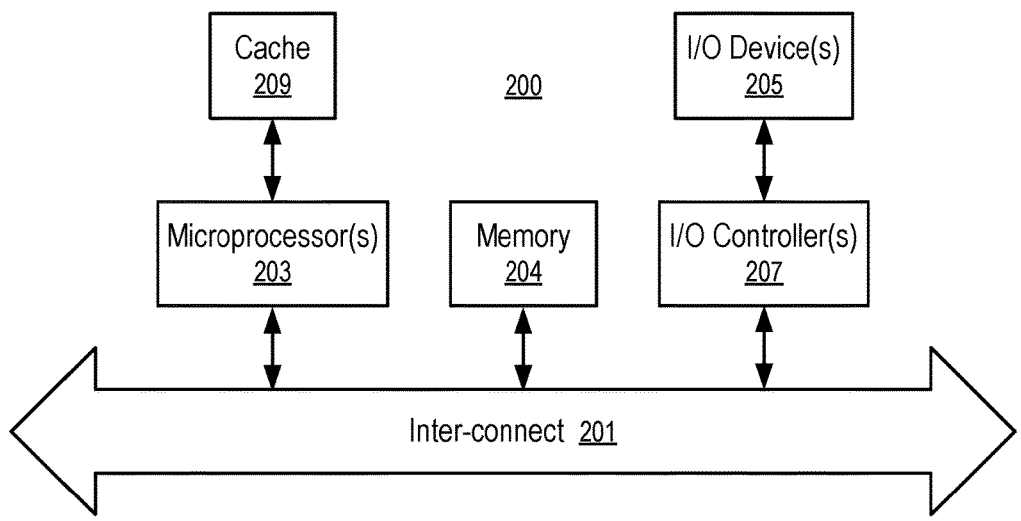
FIG. 15 illustrates a data processing system according to one embodiment.

The server (187) and/or the database (181) can be implemented as a computer apparatus in the form of a data processing system illustrated in FIG. 15.

FIG. 15 illustrates a data processing system according to one embodiment. While FIG. 15 illustrates various components of a computer system, it is not intended to represent any particular architecture or manner of interconnecting the components. One embodiment may use other systems that have fewer or more components than those shown in FIG. 15.

In FIG. 15, the data processing system (200) includes an inter-connect (201) (e.g., bus and system core logic), which interconnects one or more microprocessors (203) and memory (204). The microprocessor (203) is coupled to cache memory (209) in the example of FIG. 15.

In one embodiment, the inter-connect (201) interconnects the microprocessor(s) (203) and the memory (204) together and also interconnects them to input/output (I/O) device(s) (205) via I/O controller(s) (207). I/O devices (205) may include a display device and/or peripheral devices, such as mice, keyboards, modems, network interfaces, printers, scanners, video cameras and other devices known in the art. In one embodiment, when the data processing system is a server system, some of the I/O devices (205), such as touch screens, printers, scanners, mice, and/or keyboards, are optional.

In one embodiment, the inter-connect (201) includes one or more buses connected to one another through various bridges, controllers and/or adapters. In one embodiment the I/O controllers (207) include a USB (Universal Serial Bus) adapter for controlling USB peripherals, and/or an IEEE-1394 bus adapter for controlling IEEE-1394 peripherals.

In one embodiment, the memory (204) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A non-transitory computer storage medium storing instructions configured to instruct a computing device to perform a method, the method comprising:
  receiving, for a mobile device, input data identifying:
    a plurality of time instances in a period of time; and
    a plurality of locations of the mobile device at the plurality of time instances respectively; and
  identifying, by the computing device from the input data, a location of a home of a user of the mobile device, by:
    identifying a plurality of regions, each of the regions having a predefined boundary and containing at least one of the plurality of locations of the mobile device;
    identifying a plurality of visitation types for the plurality of time instances of the mobile device being at the plurality of locations;
    computing, for each respective region in the plurality of regions, a plurality of visitation frequencies corresponding to the plurality of visitation types respectively;
    computing, for the respective region, a score based at least in part on the plurality of visitation frequencies, wherein the plurality of regions have a plurality of scores respectively; and selecting, from the plurality of region candidates and based on the plurality of scores, a home region as the home of the user.

2. The non-transitory computer storage medium of claim 1, wherein the identifying of the plurality of regions includes:
identifying, for each respective location in the plurality of locations, a respective region that contains the respective location, by:
storing cell data associating a set of cell identifiers with a set of regions, wherein each respective cell identifier in the set of cell identifiers is stored in association with a region that contains locations that are convertible to the respective cell identifier;
converting the respective location to a particular cell identifier; and
identifying, as the respective region that contains the respective location, a region that is stored in association with the particular cell identifier in the cell data.

3. The non-transitory computer storage medium of claim 2, wherein cells identified by the set of cell identifiers are in a hierarchical grid system having grid lines aligned with numbers of digits of precision in longitudinal and latitudinal coordinates on the earth.

4. The non-transitory computer storage medium of claim 1, wherein the score is based on a weight determined based on recency of locations of the mobile device in the respective region.

5. The non-transitory computer storage medium of claim 1, wherein the score is based on a weight determined based on a total number of different regions that contain the locations of the mobile device.

6. The non-transitory computer storage medium of claim 1, wherein the score is based on a weight determined based on whether the respective region has been previously identified as the home of the user of the mobile device.

7. The non-transitory computer storage medium of claim 1, wherein the predefined boundary is a parcel boundary of land in residential areas.

8. The non-transitory computer storage medium of claim 7, further comprising:
breaking a tie in the plurality of scores based on visitations to an area of a predetermined width surrounding but not within a boundary of each respective region that has the tie.

9. The non-transitory computer storage medium of claim 1, wherein the method further comprises:
determining, by the computing device, a count of different mobile devices having location in each of the regions during the period of time;
wherein the selecting of the home region is further based on the count of different mobile devices having locations in each of the regions.

10. The non-transitory computer storage medium of claim 9, wherein the selecting of the home region includes:
identifying a set of region candidates, wherein each of the region candidates has a count of different mobile devices that is less than a predetermined threshold during the period of time; and
selecting the home region from the set of region candidates based on the scores.

11. A method implemented in a computing device, the method comprising:
receiving, for a mobile device, input data identifying:
a plurality of time instances in a period of time; and
a plurality of locations of the mobile device at the plurality of time instances respectively; and
identifying, by the computing device from the input data, a location of a home of a user of the mobile device, by:
identifying a plurality of regions, each of the regions having a predefined boundary and containing at least one of the plurality of locations of the mobile device;
identifying a plurality of visitation types for the plurality of time instances of the mobile device being at the plurality of locations;
computing, for each respective region in the plurality of regions, a plurality of visitation frequencies corresponding to the plurality of visitation types respectively;
computing, for the respective region, a score based at least in part on the plurality of visitation frequencies, wherein the plurality of regions have a plurality of scores respectively; and
selecting, from the plurality of region candidates and based on the plurality of scores, a home region as the home of the user.

12. The method of claim 11, wherein the identifying of the plurality of regions includes:
identifying, for each respective location in the plurality of locations, a respective region that contains the respective location, by:
storing cell data associating a set of cell identifiers with a set of regions, wherein each respective cell identifier in the set of cell identifiers is stored in association with a region that contains locations that are convertible to the respective cell identifier;
converting the respective location to a particular cell identifier; and
identifying, as the respective region that contains the respective location, a region that is stored in association with the particular cell identifier in the cell data.

13. The method of claim 12, wherein each region in the set of regions has a predefined boundary that is a parcel boundary of land in a residential area.

14. The method of claim 13, further comprising:
determining, by the computing device, a count of different mobile devices having location in each of the regions during the period of time;
wherein the selecting of the home region is further based on the count of different mobile devices having locations in each of the regions.

15. The method of claim 14, wherein the selecting of the home region includes:
identifying a set of region candidates, wherein each of the region candidates has a count of different mobile devices that is less than a predetermined threshold during the period of time; and
selecting the home region from the set of region candidates based on the scores.

16. The method of claim 13, wherein the plurality of visitation types include at least one of:
visitations outside of working hours; and
visitations in weekends.

17. A computing device, comprising:
at least one microprocessor; and
memory storing instructions configured to instruct the at least one microprocessor to:
store, for a mobile device, data identifying:
a plurality of time instances in a period of time; and
a plurality of locations of the mobile device at the plurality of time instances respectively; and identify, by the computing device from the data, a location of a home of a user of the mobile device, by:
- identifying a plurality of regions, each of the regions having a predefined boundary and containing at least one of the plurality of locations of the mobile device;
- identifying a plurality of visitation types for the plurality of time instances of the mobile device being at the plurality of locations;
- computing, for each respective region in the plurality of regions, a plurality of visitation frequencies corresponding to the plurality of visitation types respectively;
- computing, for the respective region, a score based at least in part on the plurality of visitation frequencies, wherein the plurality of regions have a plurality of scores respectively; and
- selecting, from the plurality of region candidates and based on the plurality of scores, a home region as the home of the user.

18. The computing device of claim 17, wherein each of the visitation type is based on a characteristic of a time instance of a location of the mobile device.

19. The computing device of claim 18, wherein the characteristic is being outside of working hours.

20. The computing device of claim 18, wherein the characteristic is being in weekends.

* * * * *